(12) United States Patent
Lee et al.

(10) Patent No.: US 10,801,931 B2
(45) Date of Patent: Oct. 13, 2020

(54) SAMPLE PRETREATMENT SYSTEM AND CONTROL METHOD THEREFOR

(71) Applicant: NANOENTEK, INC., Seoul (KR)

(72) Inventors: Hyoung-Seop Lee, Uijeongbu-si (KR); Sung-Hun Hong, Seoul (KR)

(73) Assignee: NANOENTEK, INC., Seoul (KR)

( * ) Notice: Subject to any disclaimer, the term of this patent is extended or adjusted under 35 U.S.C. 154(b) by 360 days.

(21) Appl. No.: 15/757,551

(22) PCT Filed: Aug. 30, 2016

(86) PCT No.: PCT/KR2016/009641
§ 371 (c)(1),
(2) Date: Mar. 5, 2018

(87) PCT Pub. No.: WO2017/039280
PCT Pub. Date: Mar. 9, 2017

(65) Prior Publication Data
US 2018/0259432 A1 Sep. 13, 2018

(30) Foreign Application Priority Data

Sep. 4, 2015 (KR) .......................... 10-2015-0125867

(51) Int. Cl.
*G01N 1/00* (2006.01)
*G01N 1/38* (2006.01)
(Continued)

(52) U.S. Cl.
CPC ............... *G01N 1/38* (2013.01); *B01F 13/08* (2013.01); *B01F 13/0827* (2013.01);
(Continued)

(58) Field of Classification Search
None
See application file for complete search history.

(56) References Cited

U.S. PATENT DOCUMENTS

2003/0185096 A1* 10/2003 Hollstein ............ B01F 13/0845
366/273
2005/0176138 A1 8/2005 Nishimoto et al.
(Continued)

FOREIGN PATENT DOCUMENTS

JP 2005-218413 A 8/2005
JP 2007-163190 A 6/2007
(Continued)

OTHER PUBLICATIONS

International Search Report for PCT/KR2016/009641 dated Dec. 29, 2016 from Korean Intellectual Property Office.
(Continued)

*Primary Examiner* — Jyoti Nagpaul
(74) *Attorney, Agent, or Firm* — Paratus Law Group, PLLC

(57) ABSTRACT

Disclosed are a system for pretreatment of sample and a method for controlling the same. The system for pretreatment of sample, including: a holder storage unit having a module holder on which a sample pretreatment module is seated; a cartridge accommodating portion for loading a cartridge therein, wherein the sample accommodated in a chamber of the sample pretreatment module is discharged and loaded into the cartridge; a magnetic force generating unit for generating a magnetic force to rotate the permanent magnet provided in the sample pretreatment module; and a penetration and discharge unit for penetrating the penetration membrane in the sample pretreatment module and discharging the sample by pressing the moving unit of the cap.

16 Claims, 31 Drawing Sheets

(51) Int. Cl.
  G01N 1/44 (2006.01)
  B01F 13/08 (2006.01)
  G01N 1/28 (2006.01)
  H02N 11/00 (2006.01)
  G01N 35/10 (2006.01)
  B01L 9/00 (2006.01)
  B01L 3/00 (2006.01)
  G01N 35/00 (2006.01)

(52) U.S. Cl.
  CPC .......... B01L 3/502 (2013.01); B01L 9/00 (2013.01); G01N 1/28 (2013.01); G01N 1/44 (2013.01); G01N 35/10 (2013.01); G01N 35/1016 (2013.01); H02N 11/00 (2013.01); B01F 2215/0037 (2013.01); B01L 2200/026 (2013.01); B01L 2300/044 (2013.01); B01L 2300/046 (2013.01); B01L 2300/047 (2013.01); B01L 2300/0832 (2013.01); B01L 2400/043 (2013.01); G01N 2035/00534 (2013.01)

(56) References Cited

U.S. PATENT DOCUMENTS

| | | |
|---|---|---|
| 2007/0166192 A1 | 7/2007 | Ehben et al. |
| 2011/0009608 A1 | 1/2011 | Kim et al. |
| 2011/0151577 A1 | 6/2011 | Zhang et al. |

FOREIGN PATENT DOCUMENTS

| | | |
|---|---|---|
| KR | 10-2009-0107927 A | 10/2009 |
| KR | 10-2012-0131437 A | 12/2012 |
| KR | 10-2013-0083305 A | 7/2013 |

OTHER PUBLICATIONS

Extended European Search Report for related EP application No. 16842246.7 dated Apr. 24, 2019 from European Patent Office.

\* cited by examiner

SAMPLE PRETREATMENT SYSTEM AND CONTROL METHOD THEREFOR

CROSS REFERENCE TO PRIOR APPLICATIONS

This application is a National Stage Patent Application of PCT International Patent Application No. PCT/KR2016/009641 (filed on Aug. 30, 2016) under 35 U.S.C. § 371, which claims priority to Korean Patent Application No. 10-2015-0125867 (filed on Sep. 4, 2015), which are all hereby incorporated by reference in their entirety.

TECHNICAL FIELD

The present invention relates to a system for pretreatment of a sample and a method for controlling the same, more particularly to a system for pretreatment of a sample and a method for controlling the same for ensuring reliability of a test result by reducing operator errors during a pretreatment process, making the pretreatment process simple and easy to operate, and enabling a fixed quantity of pretreated sample to be discharged.

BACKGROUND ART

In general, the analysis of fluid samples is widely used not only in the fields of chemistry and biotechnology but also in the field of diagnosis through analysis of blood and body fluids collected from patients.

In recent years, a variety of miniaturized analytical and diagnostic instruments and techniques have been developed to perform such fluid sample analysis more easily and efficiently.

On the other hand, one of the important things in the methods for analyzing such fluid samples is to pretreat fluid samples.

Here, the pretreatment of the fluid sample means that a desired amount of sample extracted before analysis of the fluid sample, for example, is accurately treated at a proper ratio in a dilution buffer and the like, is mixed with a solid or liquid reaction reagent, or is separated and refined by using a filling or a supporter.

Typically, a fluid sample is pretreated using a pipette or dropper for this purpose, but regarding analysis of a sample in a unit of lab-on-a-chip or lab-on-a-tip, it is not easy for an operator to precisely treat a desired minimum amount of sample using a pipette or dropper since the amount of sample used in the pretreatment is very small and the sample must be treated very accurately.

In addition, in the field inspection method, the collected sample is pretreated and then put into the measuring instrument again. In the input step, there is a problem of error in the amount of the sample applied once again.

Therefore, there is a need for a sample pretreatment system capable of minimizing operator's error in pretreatment of a very small amount of blood or other samples, facilitating the pretreatment process easily, and capable of discharging a fixed quantity of pretreated samples.

DISCLOSURE

Technical Problem

Embodiments of the present invention minimize errors that may occur when a worker manually proceeds, and ensure accuracy and uniformity in the pretreatment and test results of the samples.

In addition all the process of mixing, discharging of the sample, and loading of a diagnosis cartridge can be performed automatically and easily, thereby, enhancing the convenience of the operation and providing a user-friendly experimental environment.

Further, in the pretreatment and loading of the sample, the module and the cartridge are automatically heated to maintain the desired temperature for a desired time, thereby improving mixing efficiency and reaction efficiency.

In addition, it is intended to maintain and control the pressure in the chamber uniformly so as to prevent the outpouring of the sample even in sudden changes of the pressure in the chamber.

In addition, it is intended to heat the sample to the desired temperature within a short time to increase the mixing and reaction efficiency of the sample by increasing the heat transfer power for the sample in the chamber.

In addition, it is intended that the mixing effect of the sample is increased by using the magnetic force and the mechanical drive is minimized.

In addition, it is intended to provide one-stop service for sample pretreatment, discharge of a fixed amount, and loading.

Technical Solution

According to one aspect of the present invention, a sample pretreatment system may be provided to comprise a holder storage unit having a module holder on which a sample pretreatment module is seated, a cartridge accommodating portion for loading a cartridge therein, wherein the sample accommodated in a chamber of the sample pretreatment module is discharged and then loaded into the cartridge, a magnetic force generating unit for generating a magnetic force to rotate the permanent magnet provided in the sample pretreatment module, and a penetration and discharge unit for penetrating the penetration membrane in the sample pretreatment module and discharging the sample by pressing the moving unit of the cap.

The module holder may comprise a module heater surrounding the outside of the module holder for heating the sample pretreatment module.

The penetration and discharge unit may comprise an edge pressing portion for pressing the cap edge portion of the sample pretreatment module so as to penetrate the penetration membrane in the sample pretreatment module, and a moving unit pressing portion for pressing the moving unit to discharge the sample.

The penetration and discharge unit may further comprise a first moving bar connected to the edge pressing portion, a second moving bar connected to the moving unit pressing portion, and a first motor for driving the first moving bar and the second moving bar. The first moving bar and the second moving bar can be configured to be simultaneously moved away from each other or vice versa by operation of the first motor.

The penetration and discharge unit may further comprise a through hole formed in the center of the edge pressing portion, and the moving unit pressing portion can be provided to press the moving unit as it moves through the through hole.

The magnetic force generating unit may comprise a vortexing magnet rotatably installed on one side of the module holder, and a second motor for rotating the vortexing magnet.

The cartridge accommodating portion may comprise a cartridge holder capable of accommodating the cartridge therein for loading or unloading the cartridge, and a third motor for providing a driving force to move the cartridge holder toward a loading or unloading position.

The cartridge accommodating portion may further comprise a cartridge heater for heating the loaded cartridge, and the cartridge heater may be configured to ascend or descend depending on loading or unloading of the cartridge.

Here, the sample pretreatment system according to the present invention may further comprise a heater connection portion surrounding at least some portion of the cartridge heater and adhering to the cartridge. The heater connection portion has a larger area than the reaction area of the cartridge.

The cartridge heater may be provided to have an area including the area of the heater connection portion covering the reaction area of the cartridge.

The heater connection portion is desired to be in a flat shape to adhere to the reaction area of the cartridge.

The cartridge heater may be in a flat shape to correspond to the contacting surface of the heater connection portion and the cartridge.

The holder storage unit in the sample pretreatment system according to the present invention may further comprise a fourth motor for providing a driving force for loading or unloading the sample pretreatment module mounted on the module holder by moving the module holder.

The sample pretreatment system according to the present invention may further comprise a counting sensor for detecting the number of times the sample is dropped.

According to another aspect of the present invention, there is provided a control method for a sample pretreatment system, comprising: setting a cartridge into a cartridge holder and loading the cartridge into the cartridge accommodating portion; setting a sample pretreatment module accommodating a sample in a chamber into a module holder and loading it into a holder storage unit; rotating the permanent magnets provided in the chamber by rotating the vortexing magnet located at one side of the module holder; penetrating a penetration membrane in the sample pretreatment module by pressing a cap edge portion of the sample pretreatment module; and loading a sample into the cartridge by pressing the moving unit of the cap of the sample pretreatment module to discharge the sample.

The control method for the sample pretreatment system according to the present invention may further comprise heating the cartridge to maintain the cartridge at a predetermined temperature.

The control method for the sample pretreatment system according to the present invention may further comprise heating the sample pretreatment module mounted on the module holder and maintaining the sample pretreatment module at a predetermined temperature for a predetermined time.

Advantageous Effects

Embodiments of the present invention minimize the errors that may occur when the operator proceeds directly by hand, and ensure accuracy and uniformity in the pretreatment and test results of the sample.

In addition all the process of mixing, discharging of the sample, and loading of a diagnosis cartridge can be performed automatically and easily, thereby, enhancing the convenience of the operation and providing a user-friendly experimental environment.

Further, in the pretreatment and loading of the sample, the module and the cartridge are automatically heated to maintain the desired temperature for a desired time, thereby improving mixing efficiency and reaction efficiency.

In addition, it is intended to maintain and control the pressure in the chamber uniformly so as to prevent the outpouring of the sample even in sudden changes of the pressure in the chamber.

In addition, it is intended to heat the sample to the desired temperature within a short time to increase the mixing and reaction efficiency of the sample by increasing the heat transfer power for the sample in the chamber.

In addition, it is intended that the mixing effect of the sample is increased by using the magnetic force and the mechanical drive is minimized.

In addition, it is intended to provide one-stop service for sample pretreatment, discharge of a fixed amount, and loading.

BEST MODES

Figure 1:
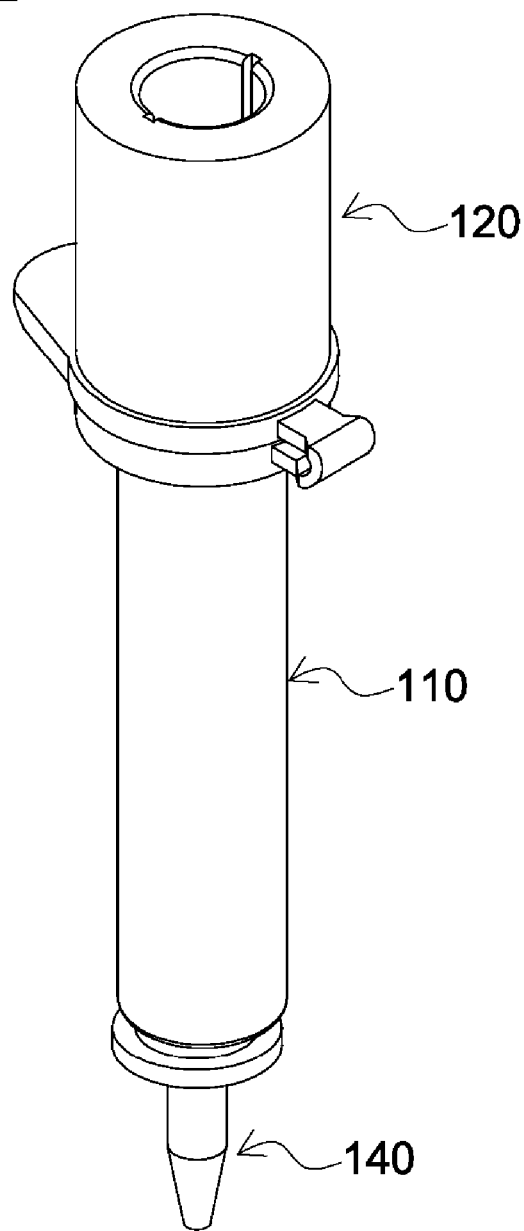
FIG. 1 is a perspective view of a sample pretreatment module according to an embodiment of the present invention.

Hereinafter, preferred embodiments of the present invention will be described in detail with reference to the accompanying drawings. However, the present invention is not limited to the embodiments described herein but may be embodied in other forms. Rather, the embodiments disclosed herein are being presented so that this disclosure will be thorough and complete, and will fully convey the concept of the invention to those skilled in the art. Like reference numerals designate like elements throughout the specification.

Figure 2:
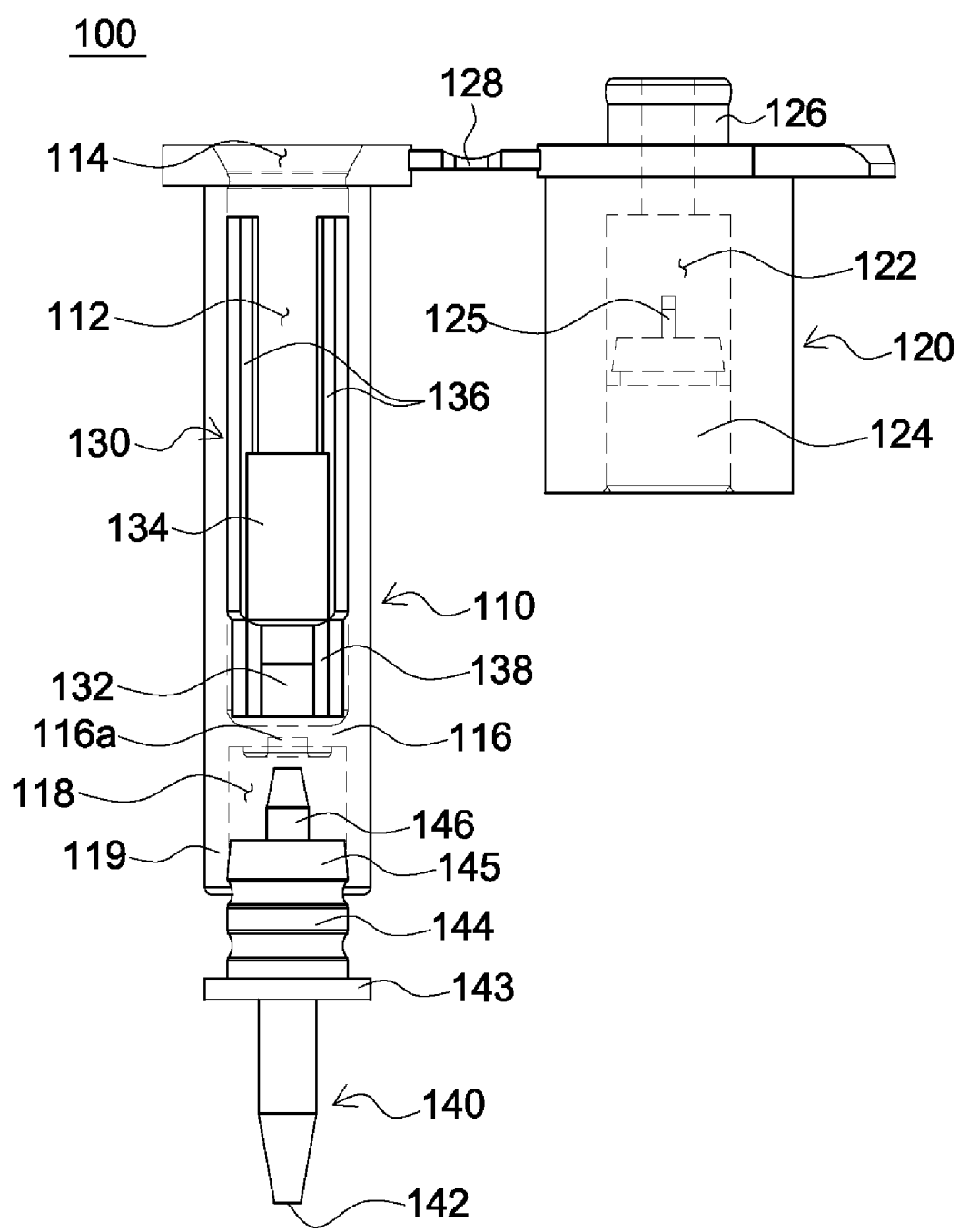
FIG. 2 is a side view of a sample pretreatment module according to an embodiment of the present invention.
Figure 3:
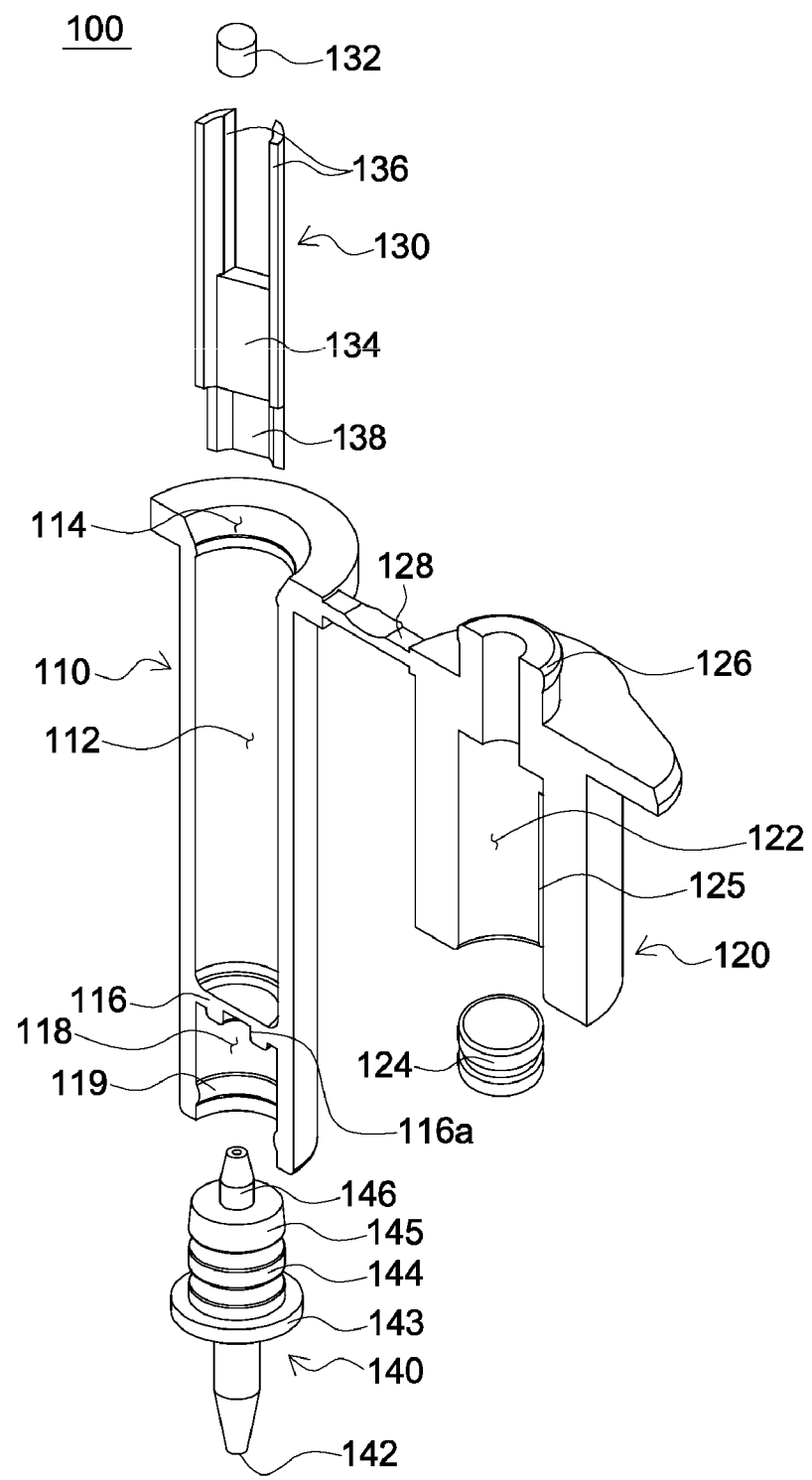
FIG. 3 is a partially exploded perspective view of a sample pretreatment module according to an embodiment of the present invention.
Figure 4:
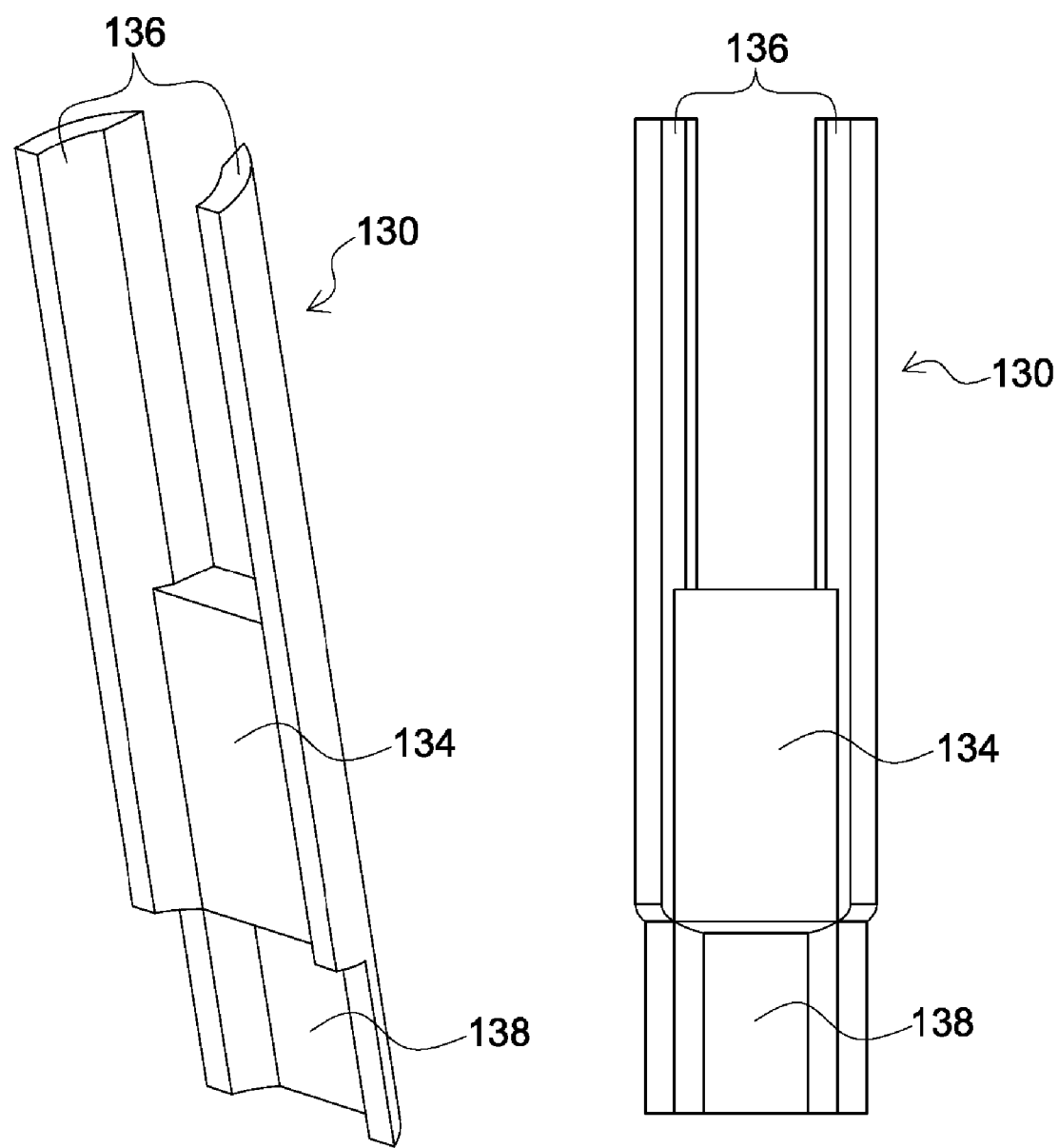
FIG. 4 is a perspective view and a side view showing a dotting substrate of a sample pretreatment module according to an embodiment of the present invention
Figure 5:
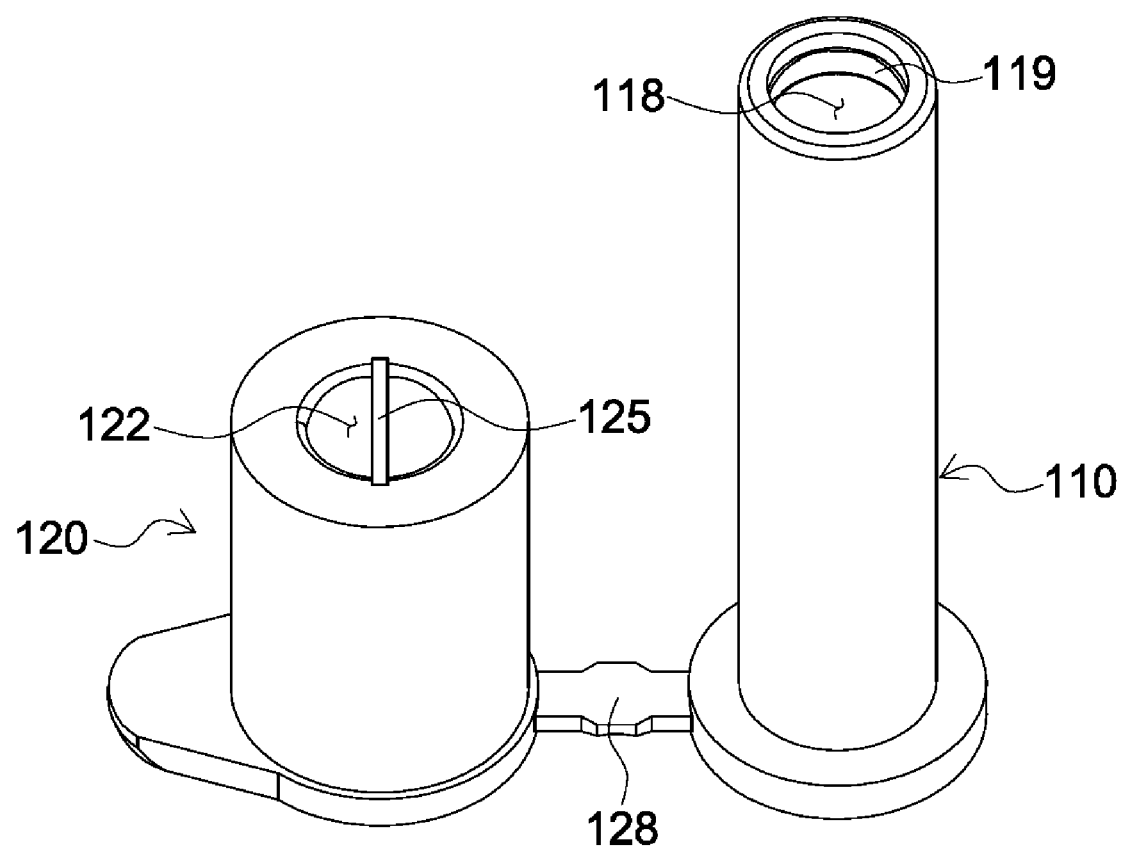
FIG. 5 is a perspective view illustrating a body and a cap of a sample pretreatment module according to an embodiment of the present invention.
Figure 6:
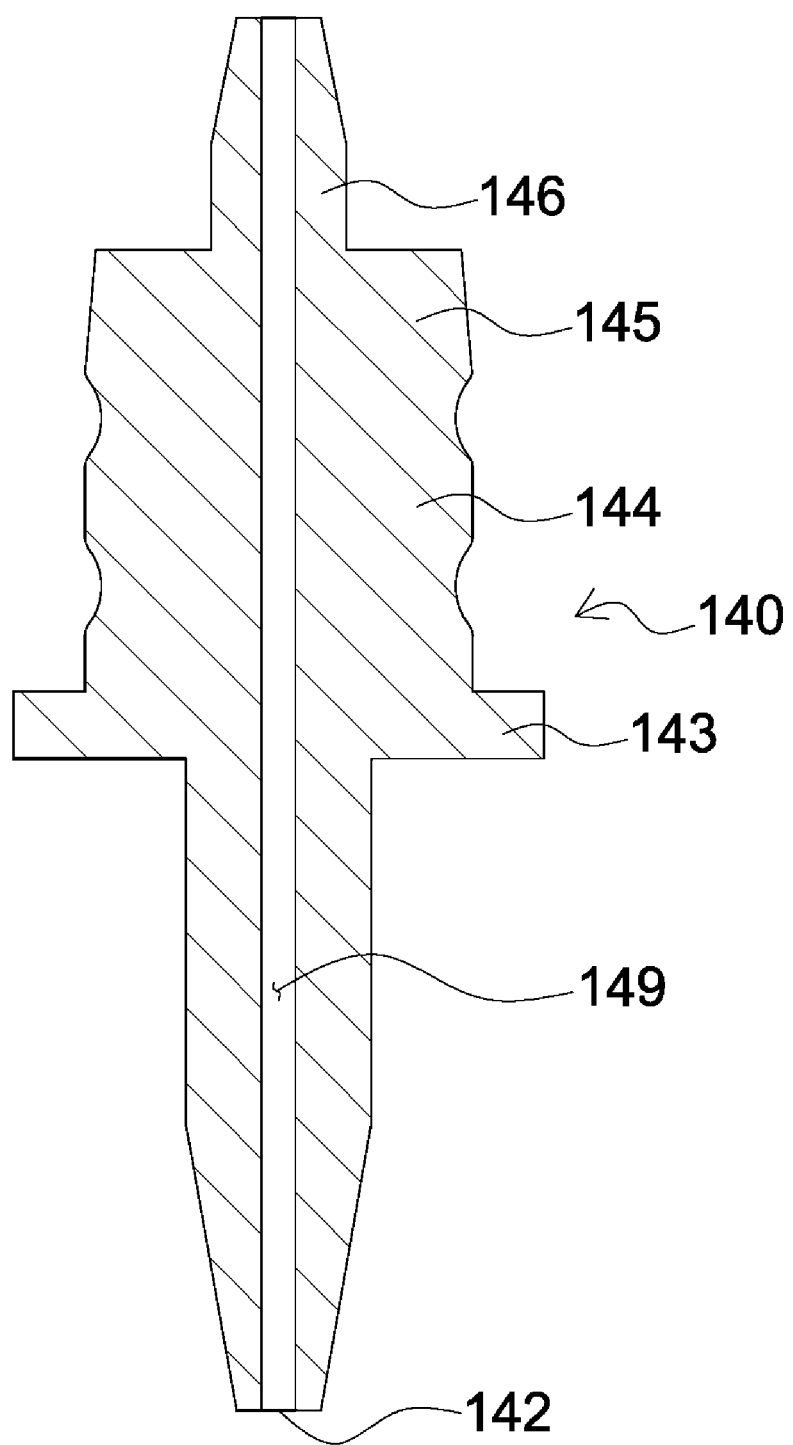
FIG. 6 is a cross-sectional view illustrating a discharge tip of a sample pretreatment module according to an embodiment of the present invention.
Figure 7:
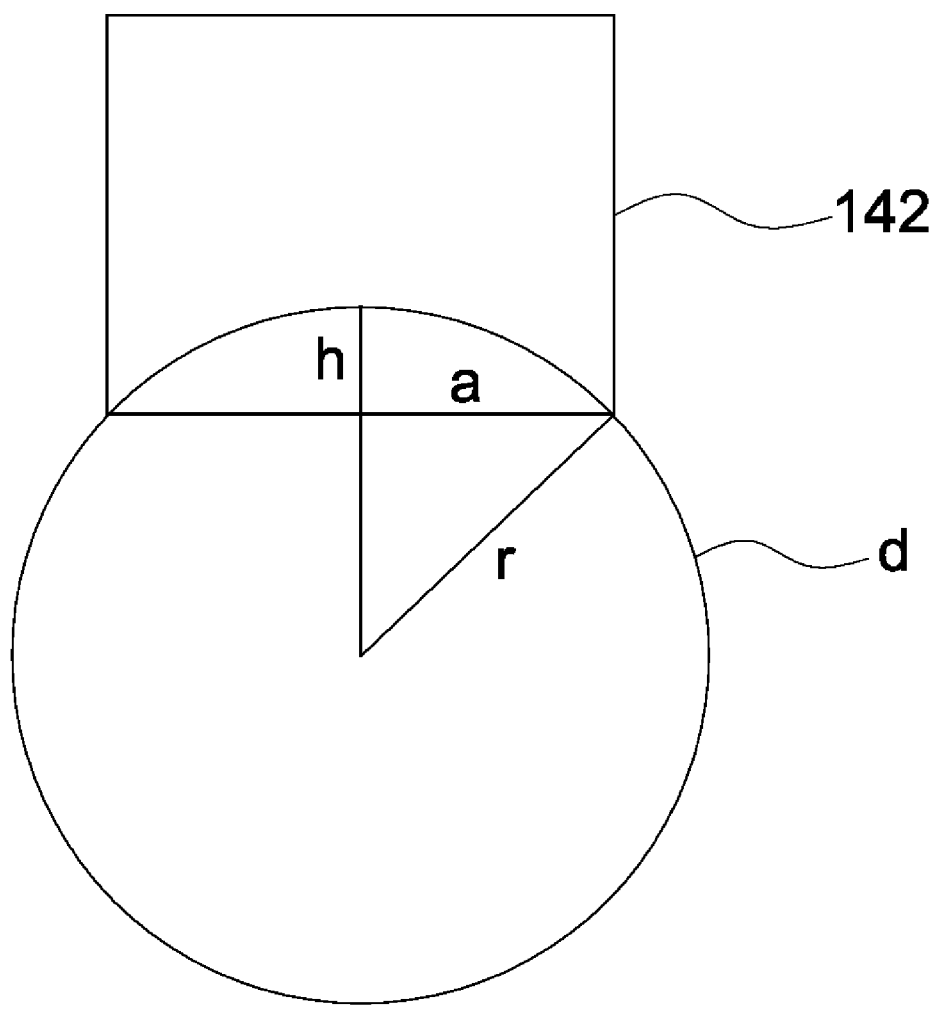
FIG. 7 is a view for explaining a method of calculating a diameter of a discharge port for discharging a fixed amount by a sample pretreatment module according to an embodiment of the present invention

FIG. 1 is a perspective view of a sample pretreatment module according to an embodiment of the present invention, FIG. 2 is a side view of a sample pretreatment module according to an embodiment of the present invention, FIG. 3 is a cross-sectional exploded perspective view of the pretreatment module according to an embodiment of the present invention. FIG. 4 is a perspective view and a side view showing a dotting substrate of a sample pretreatment module according to an embodiment of the present invention, FIG. 5 is a perspective view showing a body and a cap of a sample pretreatment module according to an embodiment of the present invention, FIG. 6 is a cross-sectional view illustrating a discharge tip of a sample pretreatment module according to an embodiment of the present invention. FIG. 7 is a view for explaining a method of calculating a diameter of a discharge port for discharging a fixed amount by a sample pretreatment module according to an embodiment of the present invention.

As shown in FIG. 1 to FIG. 7, a sample pretreatment module 100 according to an embodiment of the present invention may comprise a body 110 having a chamber 112 for accommodating a sample therein, a cap 120 coupled to one end of the body 110, a dotting substrate 130 of which at least some portion is dotted and inserted into the chamber 112, and a discharge tip 140 movably coupled to the other end of the body 110 for discharging the sample accommodated by the chamber 112.

In this embodiment, the body 110 may be formed in a cylindrical shape having a predefined height, and a chamber 112 may be formed in the body 110 to form a cylindrical space. The shape of the body 110 and the chamber 112 is not limited to a cylindrical shape, and may be modified into various shapes as necessary.

The body 110 is preferably formed as thin as possible so as to increase the heat transfer ability when the sample accommodated in the chamber 112 is heated.

An inlet 114 is provided at one side of the body 110 so that a sample or buffer can be injected into the chamber 112. The dotting substrate 130 can be also inserted into the chamber 112 through the inlet 1124 and accommodated in the chamber.

A discharge tip 140 is coupled to the other side of the body 110 and a penetration membrane 116 may be provided between the chamber 112 and the discharge tip 140. The sample can be accommodated in the chamber 112 by blocking the communication with the discharge tip 140 until the penetration membrane 116 is penetrated by the penetration portion 146, which will be described later.

The penetration membrane 116 is dried in a state where a dotted buffer is applied to the chamber 112 before the sample is injected. Then the injected sample is passed through a pretreatment process by being mixed with a buffer to form a diluted or mixed solution.

At this time, It is also possible to apply a pretreatment material to the inside of the chamber 112, such as the inner wall of the chamber 112 as well as the penetration membrane 116.

The body 110, the discharge tip 140, the cap 120 and the penetration membrane 116 may be made of a synthetic resin such as PS (polystyrene), PP (polypropylene), or PE (polyethylene) or other materials with elasticity can also be used and can be produced by injection molding using an elastic material.

Particularly, when vitamin D is used as a buffer, it is preferable that the resin material of the discharge tip 140 is made of PP. This is from taking into account the viscosity of the solution. Since the pretreatment solution of vitamin D has a low viscosity, the discharge tip 140 is made hydrophobic. Accordingly, the sample is not flowed inadvertently and is discharged as a fixed amount in a controlled manner.

On the contrary, when the viscosity of the pretreatment solution is high, the discharge tip 140 may be made of a hydrophilic material. Accordingly the sample mixed with the buffer can be smoothly discharged.

The dotting substrate 130 is accommodated in the chamber 112 together with the sample, and inserted with at least one side dotted with a predetermined reagent. Accordingly, the accommodated sample can be reacted or mixed with the reagent. The dotting substrate 130 can be inserted with being dotted with not only a reagent but additional samples or pretreatment material.

The dotting substrate 130 may comprise a dotting substrate body 134, a first extension portion 136 which is at least one extending at one side of the dotting substrate body 134, and a second extension portion 138 which is at least one extending at the other side of the dotting substrate 134.

The dotting substrate body 134 has a substantially rectangular polygonal shape and the reagent described above may be mainly applied to the second extension portion 138. The body 134 and the first extension portion 136 may be dotted with reagents and inserted into the chamber 112.

In this embodiment, the first extension portion 136 may extend upward from both sides of the dotting substrate body 134. In this embodiment, the first extension portion 136 is formed by extending the first extension portion 136 in two portions to secure a sample injection space, and to provide a space for a pipette to enter the entrance of the chamber 112. In addition, the dotting substrate 130 is designed to contact so closely the outer wall of the chamber 112 that the dotting substrate 130 can be inserted into the chamber 112 even in case an error occurs.

The second extension portion 138 may extend downward from a lower portion of the dotting substrate body 134. At this time, the second extension portion 138 may extend downwardly from the body 134 in a stepped manner.

The reagent which is originally to be dotted should exist within the area where the sample is contacted. When the reagent is dropped on the surface of the second extension portion 138, the reagent is diffused when it is dried on the surface of the second extension portion 138. Accordingly, it is difficult to locally control the doting area. However, in this embodiment, since a step is formed between the dotting substrate body 134 and the second extension portion 138, the reagent can be dotted without spreading out of the step difference.

And the length of the second extension portion 138 may be extended as much as (or below) the level of the sample accommodated in the chamber 112 to allow the sample and the reagent to react completely. That is, the area of the second extension portion 138 or the extending length thereof can be adjusted according to the amount of the sample to be injected.

The shape of the dotting substrate 130 is not limited to that shown in FIG. 4, and may be modified into various shapes as necessary.

A permanent magnet 132 may be inserted together the dotting substrate 130 into the chamber 112. In this embodiment the permanent magnet 132 is formed in a cylindrical shape, and performs a role of mixing the sample by rotating by magnetic force acting in accordance with a change of magnetic field externally applied. At this time, the permanent magnet 132 may be seated in the space formed by the second extension portion 130 to perform sample mixing.

The permanent magnet 132 is magnetized in N-S or S-N along the vertical direction. When the electromagnet M (See FIG. 29) is rotated around the chamber 112, the permanent magnet 132 is also rotated along the circumferential direction.

At this time, the rotation axis of the electromagnet M and the rotation axis of the permanent magnet 132 are perpendicular to each other. In case the electromagnet M is positioned above or below the sample pretreatment module 100, the rotation axis of the electromagnet M and the rotation axis of the permanent magnet 132 are parallel to each other.

As described above, the second extension portion 138 of the dotting substrate 130 may be provided with additional samples dotted and dried thereon. For example, gold nanoparticles (See G, FIG. 25) can be dotted and dried on the second extension portion 138 to be mixed with the sample in the chamber 112.

Apart from the cold nanoparticles (G), a variety of pretreatment materials can be used. As a method of applying the pretreatment material to the dotting substrate 130, not only the aforementioned dotting and drying but also freezing drying and the like can be selectively applied.

In addition, the pretreatment material can be accommodated in the chamber 112 such as the penetration membrane 116, inner wall of the chamber 112, and the like by using the method described above.

The entire length of the dotting substrate 130 may be configured to coincide with the length of the chamber 112. Accordingly, when the dotting substrate 130 is inserted in the chamber 112, it can perform a role of a frame maintaining the shape of the chamber 112.

A cap 120 may be coupled to the inlet 114 of the body 110. The cap 120 may be connected to one side of the body 110 by a cap connection portion 128. The cap 120 may comprise a hollow portion 122 communicating with the chamber 112 and a moving unit 124 provided to be movable in the hollow portion 122 so as to discharge the sample in the chamber 112 by pressurizing it according to the movement. The moving unit 124 may be made of, for example, a rubber packing.

The hollow portion 122 may communicate with the chamber 112 when the cap 120 is coupled to the body 110. For this, the cap 120 is provided with a chamber communicating portion 126 extending from the hollow portion 122. The chamber communicating portion 126 is inserted into the inlet 114 so that the cap 120 can be inserted into the chamber communicating portion 126. At the same time, the chamber 112 and the hollow portion 122 can communicate with each other.

When the moving unit 124 inserted into the hollow portion 122 is pressurized, the moving unit 124 moves in the direction of the chamber 112 and pressure is transferred into the chamber 112 to discharge the sample to the outside.

However, since the chamber 112 is blocked by the penetration membrane 116 as described above, the penetration membrane 116 must be penetrated before the pretreated sample is discharged. A penetration portion 146 is provided in the chamber 112 to form a discharge flow passage 149 through which the sample in the chamber 112 can be discharged by penetrating the penetration membrane 116 as the discharge tip 140 moves toward the chamber 112.

As shown in FIG. 6, the discharge tip 140 has a double-pointed structure in which the discharging portion 142 at one end and the penetration portion 146 at the other end are communicated by a discharge flow passage 149. Specifically, the discharge tip 140 has an insertion body 144 to be inserted into an insertion hole 118 formed in the body 110, and the penetration portion 146 extends from the upper end of the insertion body 144. The penetration portion 146 is formed in a pointed shape by being tapered so as to penetrate the penetration membrane 116 while moving.

In this embodiment, the penetration portion 146 may have a shape that is symmetric, inclined, and tapered so that the center portion can become sharp.

A latching protrusion 119 having a convex shape along the circumferential direction is formed on the inner circumferential side of the insertion hole 118. A latching portion 145 may be formed in an upper portion of the insertion body 144 so as to be engaged with the latching protrusion 119 during initial assembly to limit additional movement of the discharge tip 140.

Accordingly, when the body 110 and the discharge tip 140 are initially assembled, the discharge tip is inserted into the body to the extent that the latching portion 145 is engaged with the latching protrusion 119. When the sample is discharged after the sample has been diluted or mixed, the penetration portion 146 penetrates the penetration membrane 116 by pushing it with an external force.

In this case, the penetration guide 116a may be formed for guiding the penetration portion such that the penetration portion 146 can penetrate a predetermined spot of the penetration membrane 116. As shown in FIGS. 2 and 3, the penetration guide 116a guides the penetration portion 146 so that the central portion of the penetration membrane 116 can be penetrated. The penetration guide 116a is formed in such a manner that when the body 110 and the discharge tip 140 are initially assembled, the possibility can be restrained that the penetration portion 146 penetrates an arbitrary spot of the penetration membrane 116 and the sample is outpoured.

A flange portion 143 is formed at a lower portion of the insertion body 144. Since the flange portion 143 is caught on the edge of the insertion hole 118 of the body 110, it is possible to restrict the further advance of the discharge tip 140 after the penetration portion has penetrated the penetration membrane 116.

As such, the discharge flow passage 149 is formed through which the sample in the chamber 112 can be discharged in the state in which the penetration portion 146 of the discharge tip 140 has penetrated the penetration membrane 116. In such condition, the sample can be discharged through the discharging portion 142 by pressing the moving unit 124 provided in the hollow portion 122 of the cap 120 as described above.

The amount of the sample to be discharged here depends on the moving distance and speed of the moving unit 124. By configuring and applying a device capable of applying a constant speed and distance although the operator can directly press the moving unit 124, the amount to be discharged can be maintained constantly at a fixed quantity.

On the other hand, when the same speed and moving distance are applied, the amount of the discharged sample can be adjusted by varying the size of the discharging portion 142. Since the discharge tip 140 is detachably coupled to the body 110, the discharging portion 142 can be replaced with a discharging portion 142 having a diameter suitable for the kind of the sample and the discharge amount.

In addition, the droplet volume of the discharged sample can be changed according to the size of the discharging portion 142, and the discharge volume can be adjusted according to the diameter of the discharging portion 142.

As shown in FIG. 7, the discharging portion 142 is preferably formed to have a diameter corresponding to the kind of sample pretreated in the chamber 112, the amount to be discharged, and the like.

For this purpose, the diameter of the discharging portion 142 may be determined by the size of a spherical cap. For example, when the radius of the discharging portion 142 is a, the radius of the sample droplet d to be discharged is r, and the height of spherical cap is h, the volume V of the sample droplet d is $V=4/3\ \pi r^3$, and the diameter of the discharging portion 142 can be obtained from the equation $r=(a^2+h^2)/2h$.

It can be also obtained from the surface tension of the sample droplet d. For example, the diameter of the discharging portion 142 may be obtained from a formula of $W=2\pi r\gamma$, wherein W=weight of reacted sample drops, r=radius of discharge passage, $\gamma$=surface tension.

On the one hand, when the penetration portion 146 penetrates the penetration membrane 116, the pressure in the chamber 112 rapidly increases, and the sample accommodated in the chamber 112 may be leaked out. In addition, an unintended external force may be applied to the outer circumference of the body 110, which may cause the pressure in the chamber 112 to rise.

A venting line 125 may be formed on the inner wall of the hollow portion 122 of the cap 120 to adjust the pressure in the chamber 112 in case of the above-situation. The venting line 125 is formed to have a predetermined length along the vertical direction on the inner wall of the hollow portion 122 and may control the pressure in the chamber 112 by discharging the increased pressure in the chamber 112 to the outside.

In this embodiment, the venting line 125 is formed at one side and the other side of the inner wall of the hollow portion 122 so as to keep controlling the pressure in the chamber 112 even when one venting line 125 is blocked.

Figure 8:
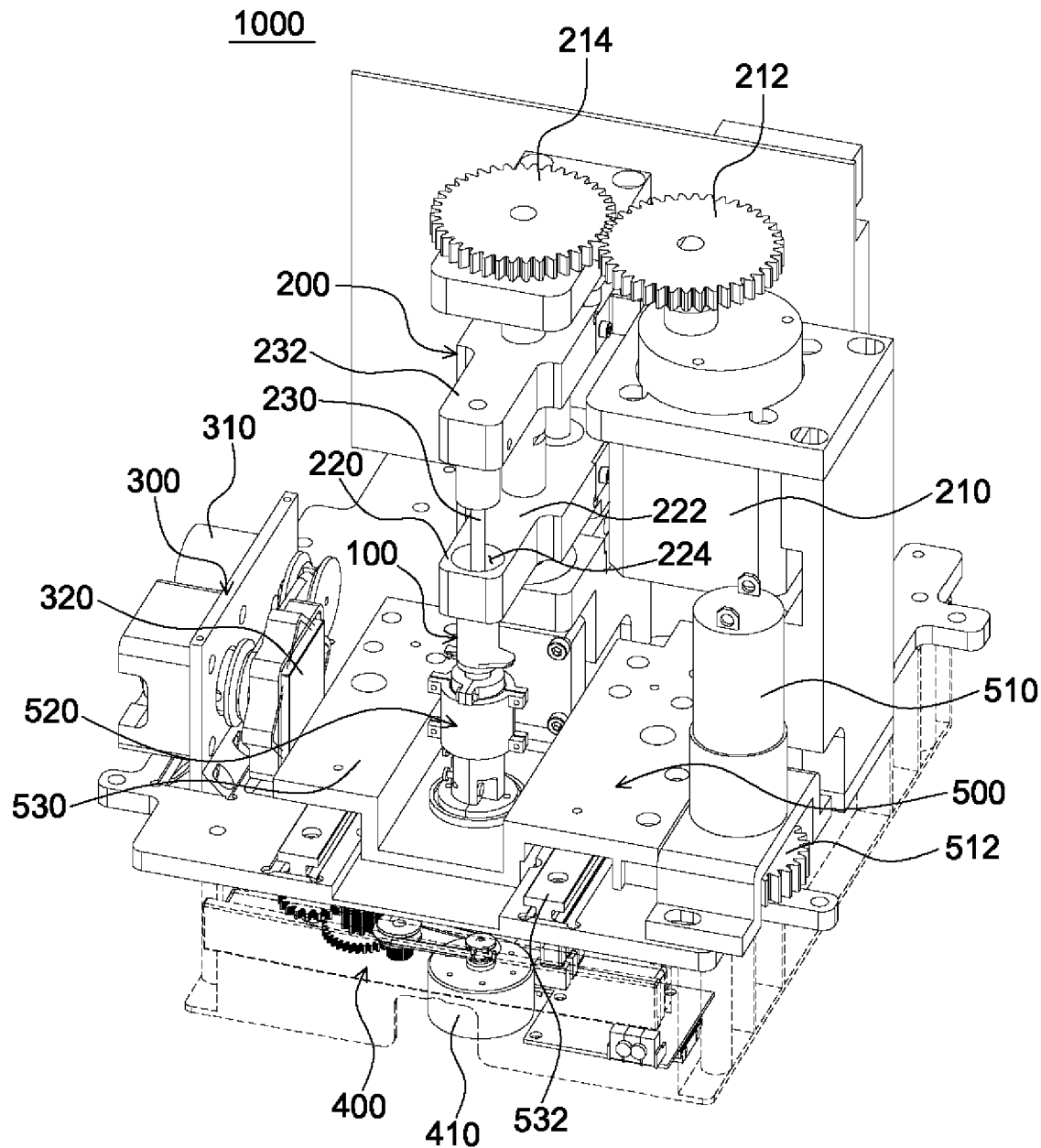
FIG. 8 is a perspective view of a sample pretreatment system according to an embodiment of the present invention.
Figure 9:
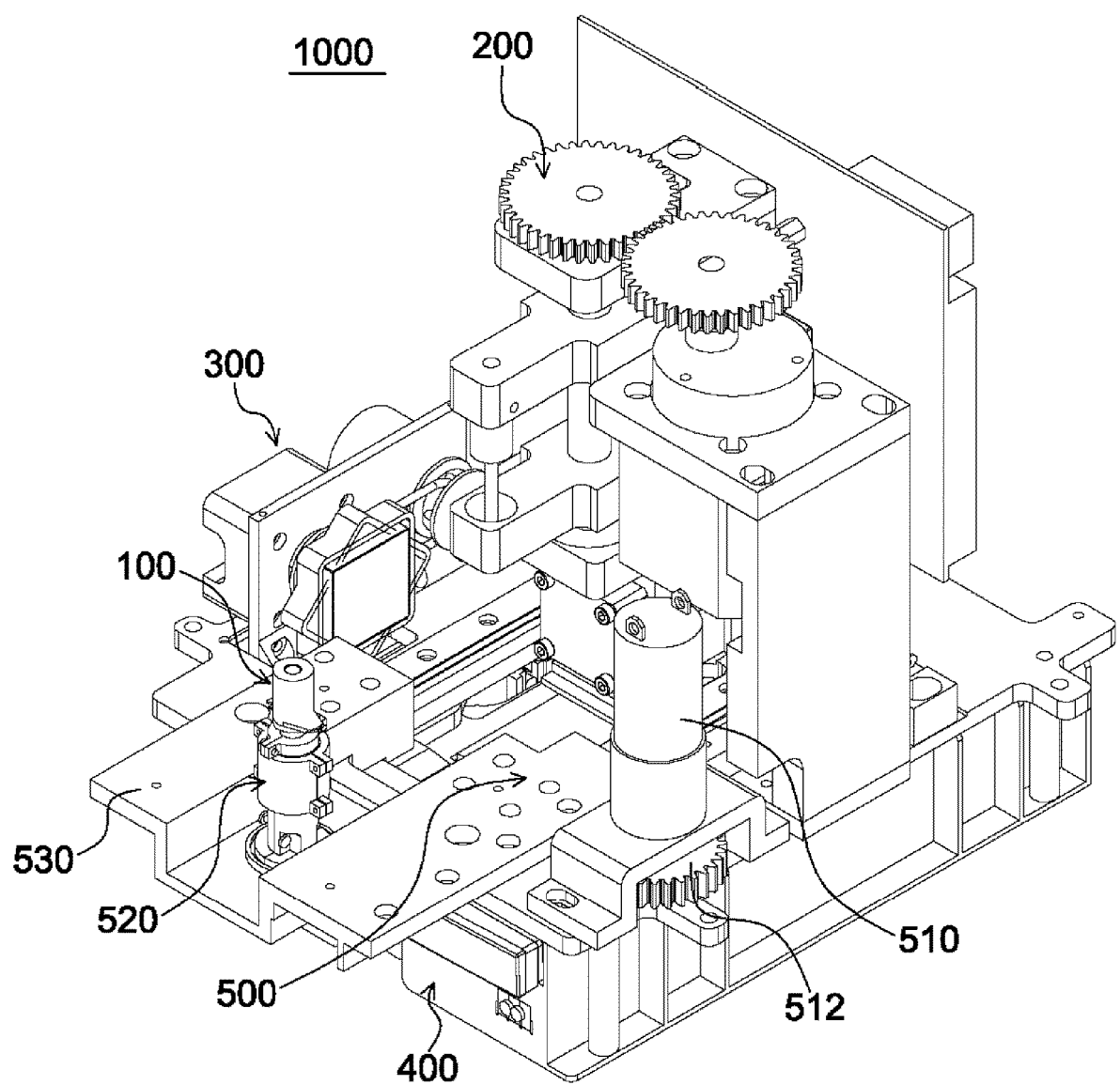
FIG. 9 is a perspective view showing a state in which a sample pretreatment module is seated in a state in which a holder stage of a sample pretreatment system is taken out according to an embodiment of the present invention.
Figure 10:
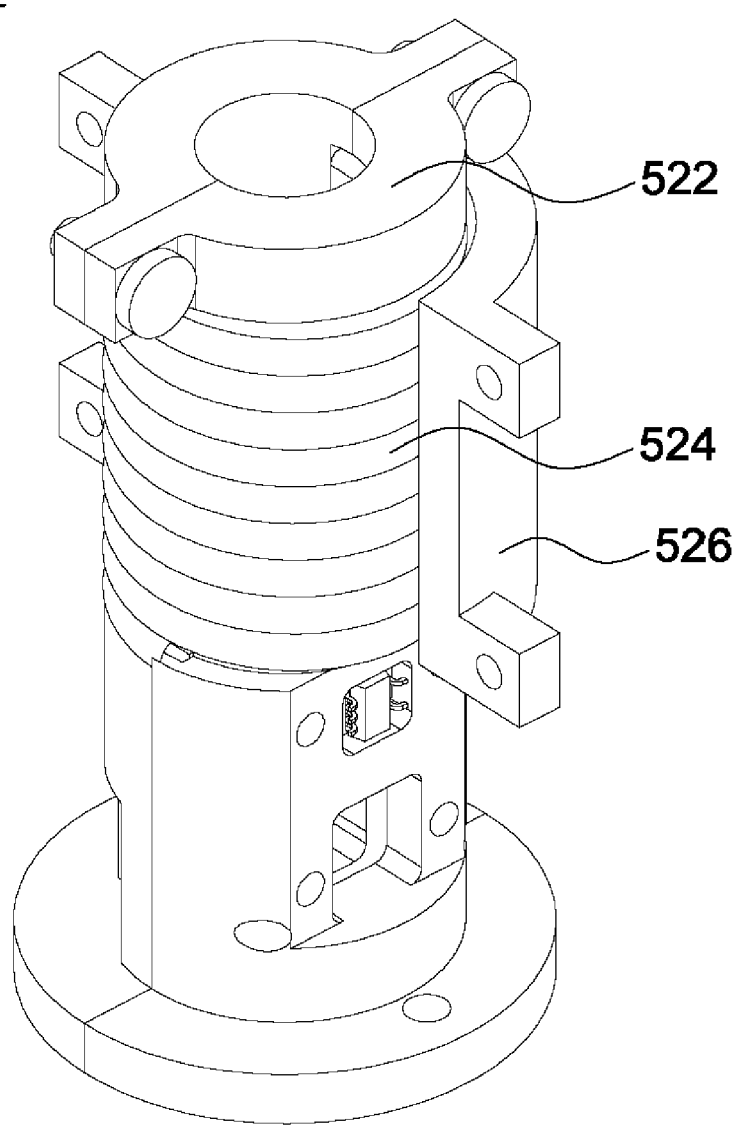
FIG. 10 is a perspective view showing a module holder of a sample pretreatment system according to an embodiment of the present invention.
Figure 11:
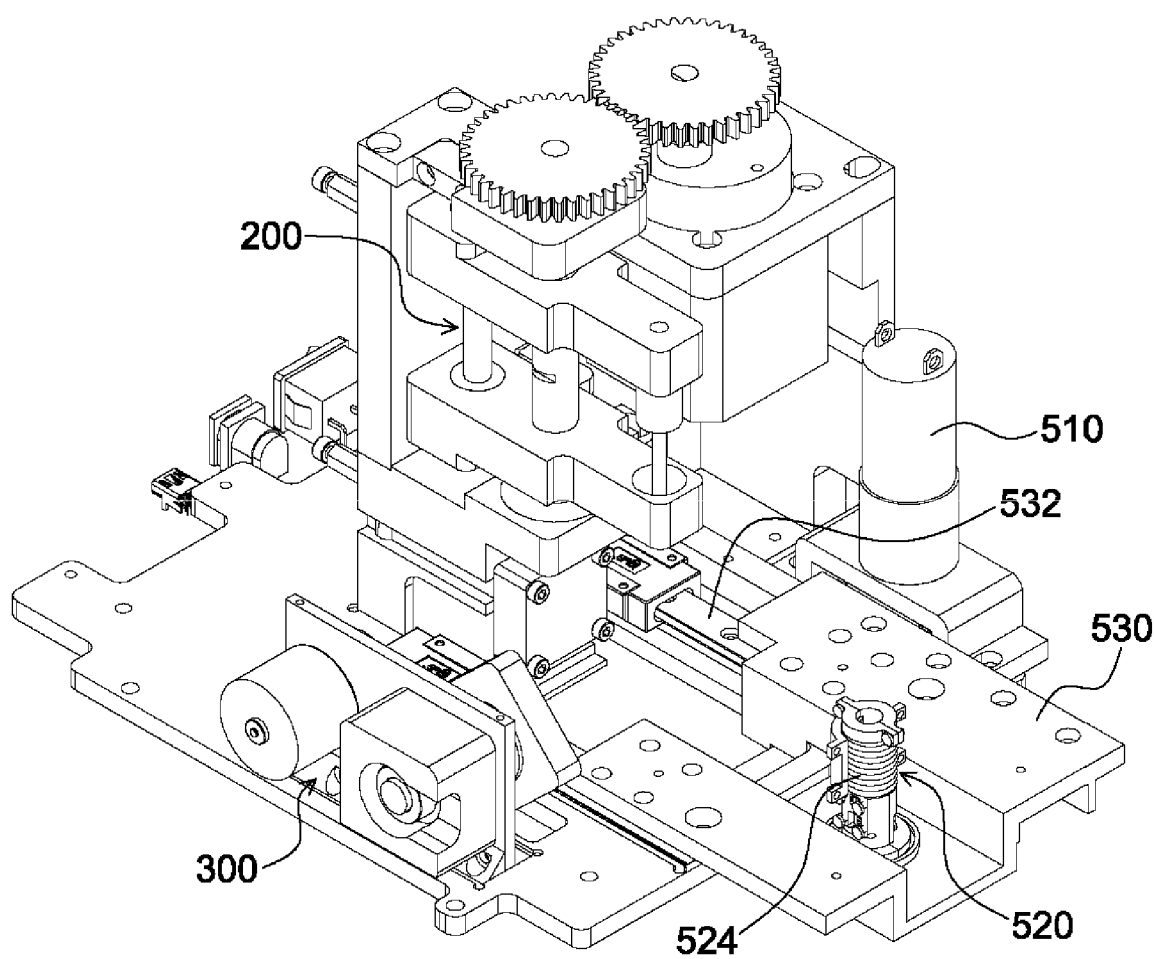
FIG. 11 is a perspective view showing a state in which the holder stage of the sample pretreatment system according to the embodiment of the present invention is drawn out.
Figure 12:
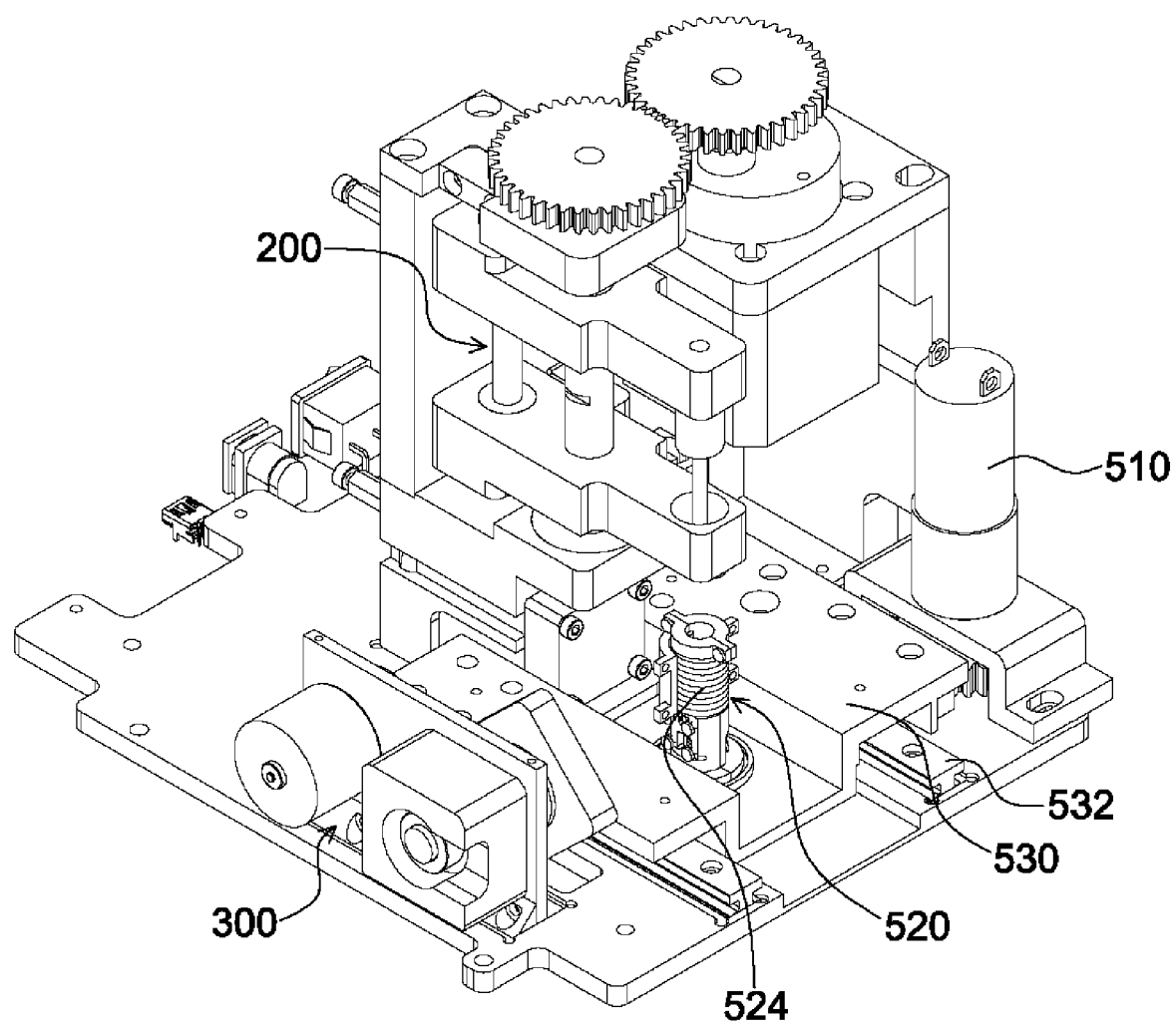
FIG. 12 is a perspective view showing a state in which a holder stage of a sample pretreatment system according to the embodiment of the present invention is accommodated.

FIG. 8 is a perspective view of a sample pretreatment system according to an embodiment of the present invention, FIG. 9 is a perspective view showing a state in which a sample pretreatment module is seated in a state in which a holder stage of a sample pretreatment system is taken out according to an embodiment of the present invention, and FIG. 10 is a perspective view showing a module holder of a sample pretreatment system according to an embodiment of the present invention. FIG. 11 is a perspective view showing a state in which the holder stage of the sample pretreatment system is taken out according to the embodiment of the present invention, and FIG. 12 is a perspective view showing the state in which a holder stage of a sample pretreatment system is accommodated according to an embodiment of the present invention.

As shown in FIG. 1 to FIG. 12, a sample pretreatment system 1000 according to an embodiment of the present invention may comprise a holder storage unit 500 having a module holder 520 on which the aforementioned sample pretreatment module 100 is seated, a cartridge accommodating portion 400 in which a cartridge (not shown) is loaded as the sample accommodated in a chamber 112 of the sample pretreatment module 100 is discharged and a magnetic force generating unit 300 for generating a magnetic force to rotate the permanent magnet 132 provided in the sample pretreatment module 100, and a penetration and discharge unit 120 for having the penetration membrane 116 of the sample pretreatment module 100 penetrated and discharging the sample by pressing the moving unit 124 of the cap 120.

The holder storage unit 500 performs a role of loading the sample pretreatment module 100 accommodating the sample to be pretreated into the sample pretreatment system 1000. As illustrated in FIG. 8, the sample pretreatment system 1000 shows its internal structure, but a cover (not shown) for covering the outside of the sample pretreatment system 1000 may be provided.

In detail, the holder storage unit 500 is provided with a module holder 520 on which the sample pretreatment module 100 is mounted as described above. The module holder 520 is installed on a holder stage 530. The holder stage 530 is movable so that the module holder 520 can be moved to a loading or unloading position.

A fourth motor 510 may be provided on one side of the holder stage 530 to provide a driving force for moving the holder stage 530 together with the module holder 520. The fourth motor 510 rotates a pinion gear 512 of the storage unit connected to the rotation shaft of the motor and the pinion gear 512 of the storage unit is engaged with a rack gear (not shown) provided below the holder stage 530 so as to move the holder stage 530 in the horizontal direction by converting the rotational motion into the horizontal motion.

Here, a guide rail 532 is provided under the holder stage 530 to guide the horizontal movement of the holder stage 530.

When the sample pretreatment module 100 is initially mounted, the fourth motor 510 is driven in one direction, and the holder stage 530 slides on the guide rail 532 to be drawn out. At this time, a door (not shown) may be provided on the entire cover (not shown) of the sample pretreatment system 1000 so that the holder stage 530 can be taken in and out.

After the sample pretreatment module 100 is mounted on the module holder 520 of the holder stage 530 drawn out to the outside, the fourth motor 510 is driven again in the opposite direction so that the holder stage 530 is slid on the guide rail 532 to be housed inward.

This operation may be implemented by pressing a switch (not shown) provided outside.

The module holder 520 provided on the holder stage 530 forms a space having a substantially cylindrical shape inside so that the sample pretreatment module 100 can be seated therein. A module heater 524 for heating the sample pretreatment module 100 may be provided outside the module holder 520.

As shown in FIG. 10, the module heater 524 comprises a heat wire surrounding the outside of the holder body 522 and heats the sample pretreatment module 100 placed inside the holder body 522 by generating heat as current flows.

As described above, since the body 110 of the sample pretreatment module 100 according to the present embodiment is thin and has high heat transfer ability, it can absorb heat emitted from the module heater 524, and heat the sample to the desired temperature within a short time. At this time, the holder body 522 interposed between the module heater 524 and the sample pretreatment module 100 is also preferably made of a metallic material having a good thermal conductivity. As shown in FIG. 10, a heater cover 526 is installed outside the module heater 524.

The temperature and the holding time of the sample pretreatment module 100 may differ according to the types of samples and buffers to be pretreated. For example, 49° C. for vitamin D is to be maintained for 10 minutes and 37° C. for FreeT4 and testosterone are to be maintained for 5 minutes.

Figure 13:
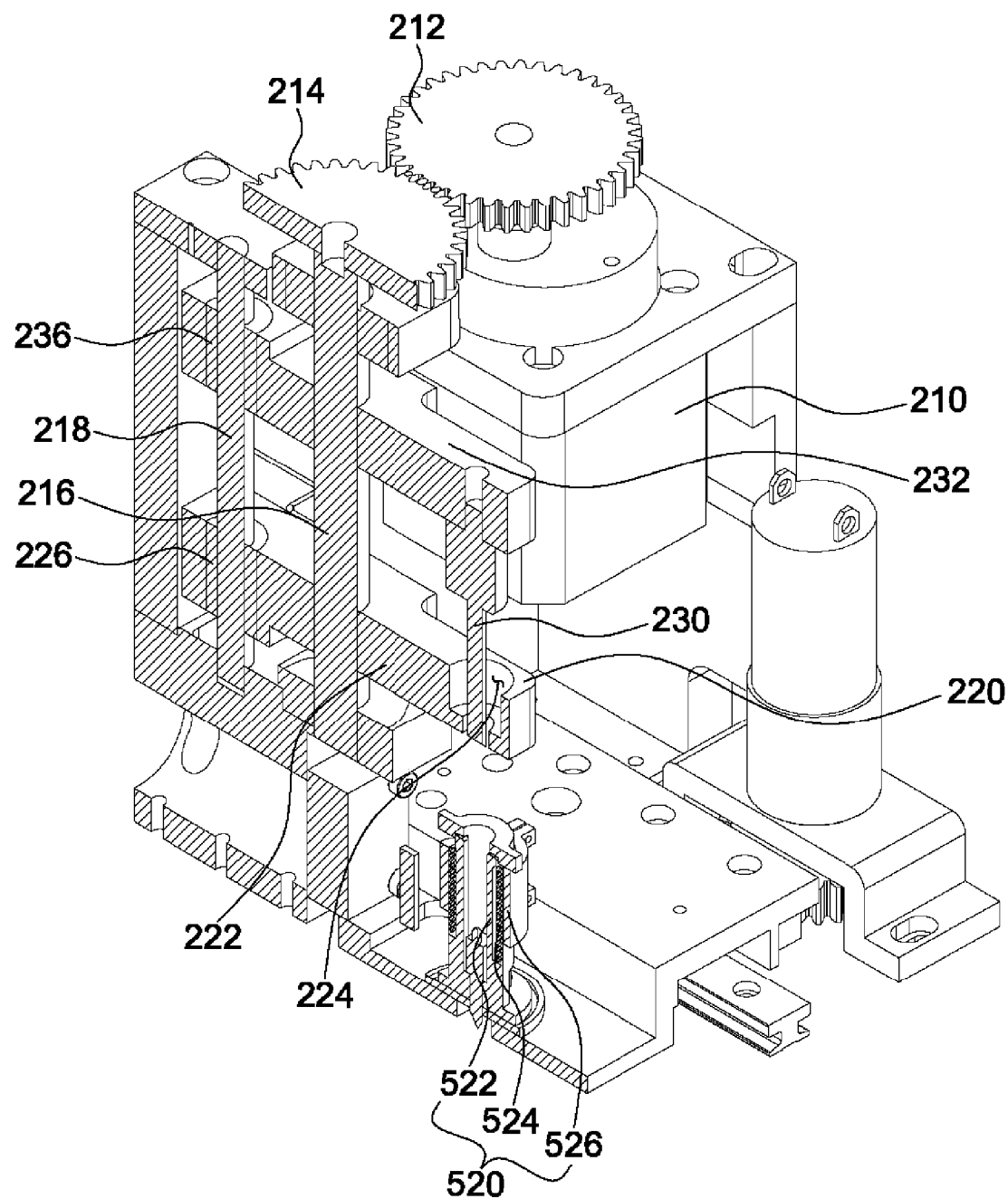
FIG. 13 is a longitudinal perspective view showing a structure of a sample pretreatment system according to an embodiment of the present invention.
Figure 14:
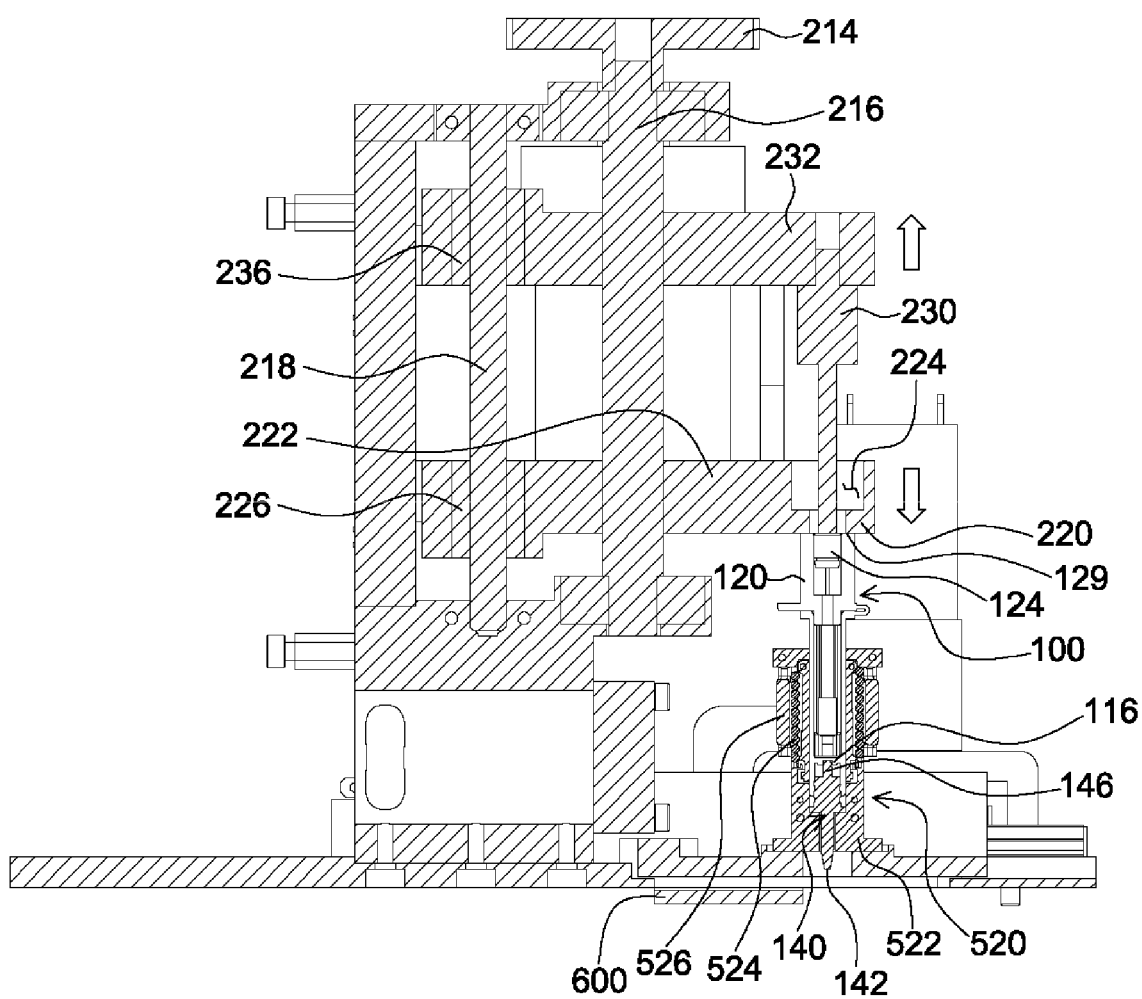
FIG. 14 is a sectional view showing a state in which the edge pressing portion of the sample pretreatment system according to an embodiment of the present invention begins to press the cap edge portion.
Figure 15:
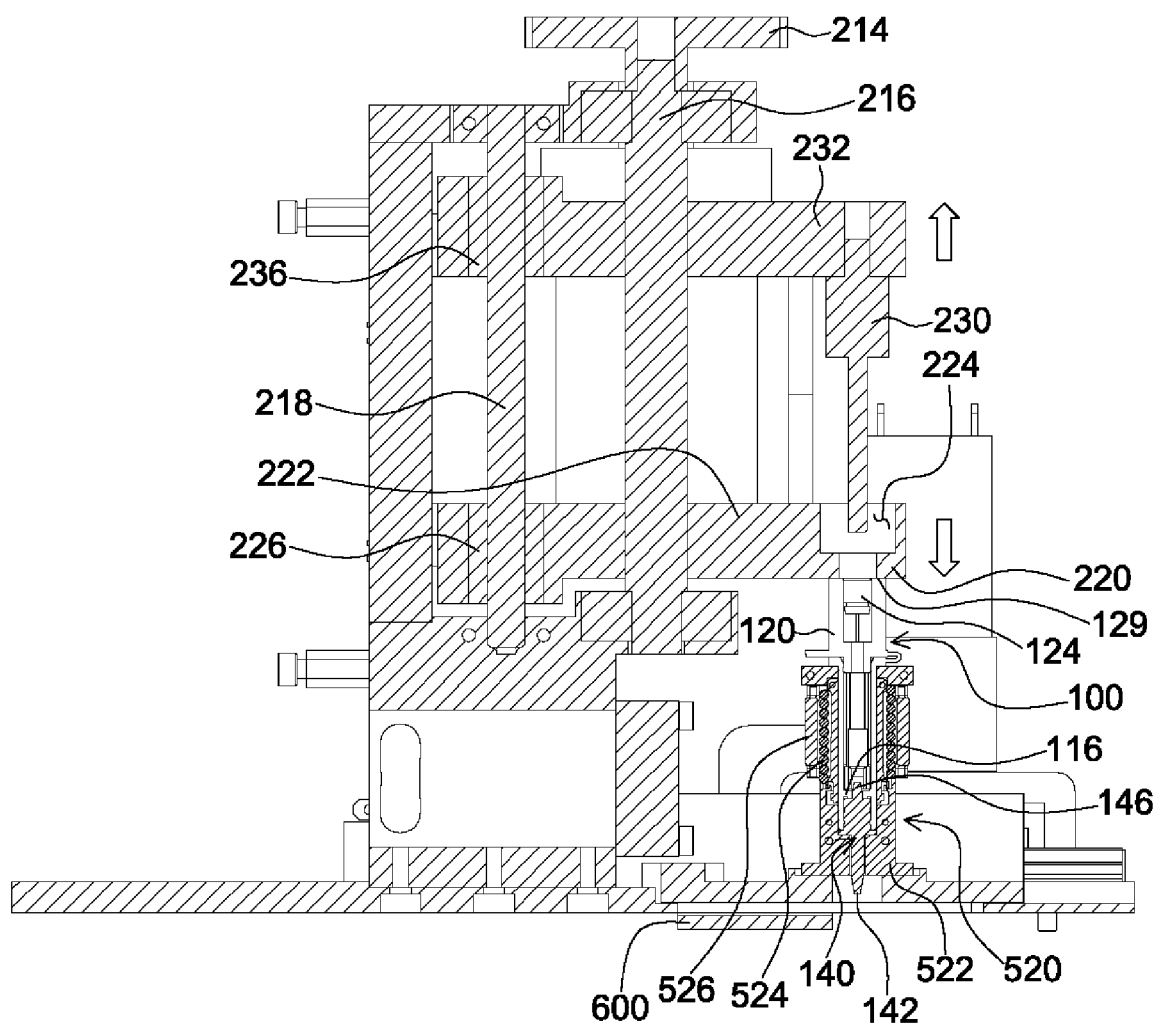
FIG. 15 is a cross-sectional view showing a state in which the edge pressing portion of the sample pretreatment system according to an embodiment of the present invention has a penetration membrane penetrated by pressing the cap edge portion.
Figure 16:
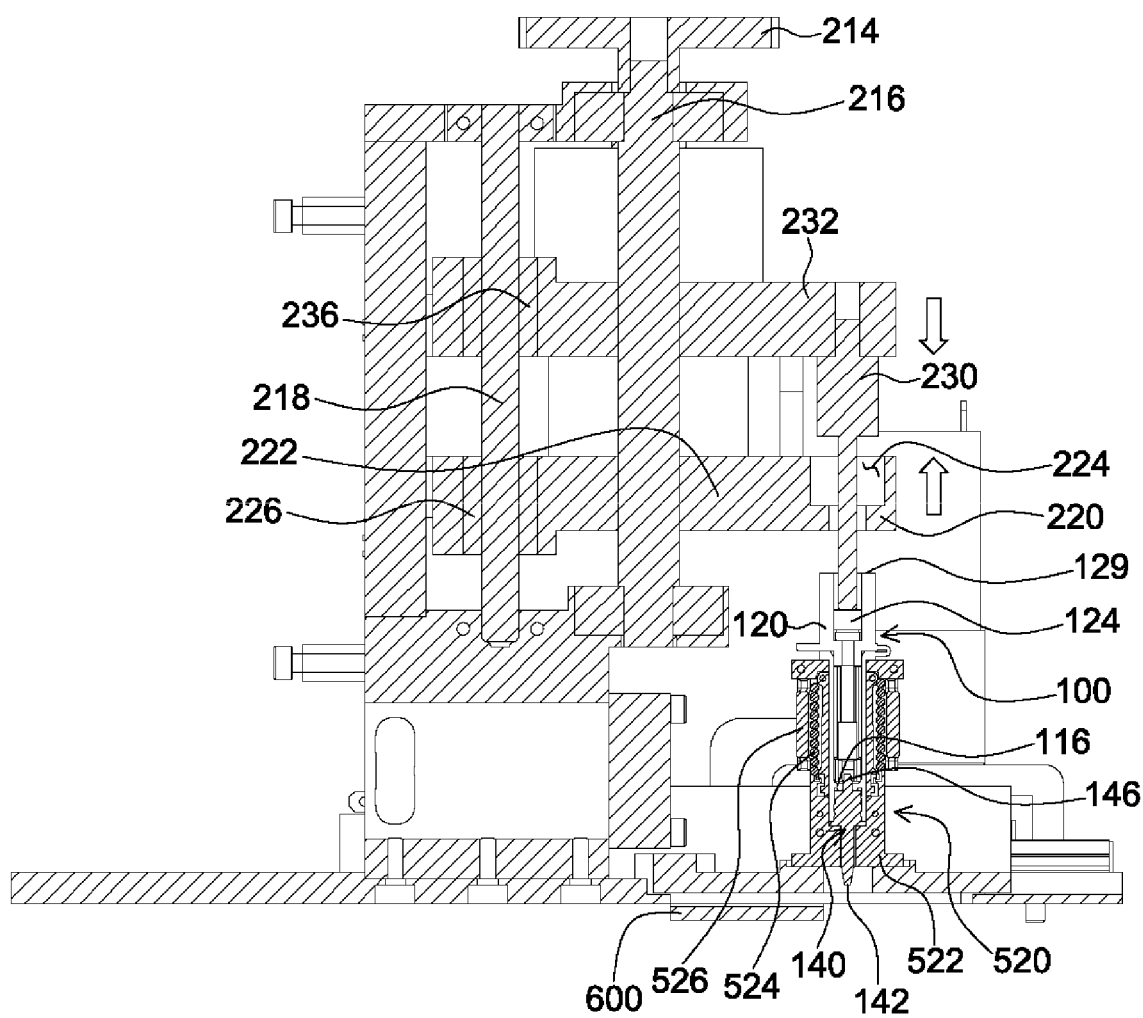
FIG. 16 is a cross-sectional view showing a state in which the moving unit pressing portion of the sample pretreatment system according to an embodiment of the present invention has the sample discharged by pressing the moving unit.
Figure 17:
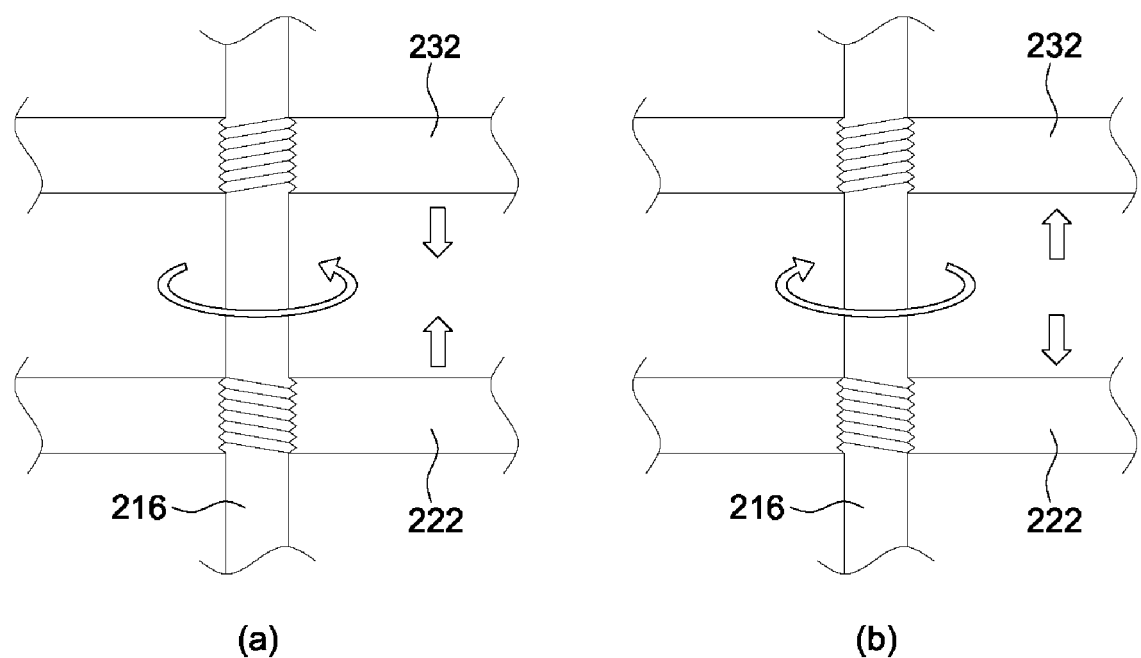
FIG. 17 is a partial structure diagram showing the operation of the penetration and discharge unit of the sample pretreatment system according to an embodiment of the present invention.

FIG. 13 is a longitudinal perspective view showing a structure of a sample pretreatment system according to an embodiment of the present invention, FIG. 14 is a sectional view showing a state in which the edge pressing portion of the sample pretreatment system according to an embodiment of the present invention begins to press the cap edge portion, FIG. 15 is a cross-sectional view showing a state in which the edge pressing portion of the sample pretreatment system according to an embodiment of the present invention has a penetration membrane penetrated by pressing the cap edge portion, FIG. 16 is a cross-sectional view showing a state in which the moving unit pressing portion of the sample pretreatment system according to an embodiment of the present invention has the sample discharged by pressing the moving unit, and FIG. 17 is a partial structure diagram showing the operation of the penetration and discharge unit of the sample pretreatment system according to an embodiment of the present invention.

As shown in FIG. 13 to FIG. 17, the penetration and discharge unit 200 may comprise an edge pressing portion 220 for pressing the cap edge portion 129 of the sample pretreatment module 100 so as to penetrate the penetration membrane 116 in the sample pretreatment module 100, and a moving unit pressing portion 230 for pressing the moving unit 124 to discharge the sample.

As the name implies, the penetration and discharge unit 200 performs both the role of penetrating the penetration membrane 116 of the sample pretreatment module 100 described above and pressing the sample to have the sample discharged.

Hereinafter, the structure of the penetration and discharge unit 200 will be described in detail as follows.

As shown in FIG. 13 to FIG. 16, a first moving bar 222 to which the edge pressing portion 220 is connected and a second moving bar 232 connected to the moving unit pressing portion 230 may be disposed respectively at the lower portion and the upper portion. That is, the second moving bar 232 is provided above the first moving bar 222.

The first moving bar 222 and the second moving bar 232 are vertically movable on the fixed shaft 218. In this embodiment, the first moving bar 222 and the second moving bar 232 are configured to be simultaneously moved away from each other or moved in direction approaching each other.

A first sliding bearing 226 and a second sliding bearing 236 are provided respectively between the fixed shaft 218 and the first moving bar 222 and between the fixed shaft 218 and the second moving bar 232 so that the movement of the first moving bar 222 and the second moving unit 124 can be performed smoothly.

The driving force for moving the first moving bar 222 and the second moving bar 232 may be provided by a first motor 210 provided at one side. The rotational force of the first motor 210 may be transmitted to the rotation shaft 216 by driving gears 212, 214 so that the rotation shaft 216 can rotate clockwise or counterclockwise.

As shown in FIG. 17, a screw thread is formed at a portion where the rotation shaft 216 is in contact with the first moving bar 222 and the second moving bar 232, and screw threads may be formed in the first moving bar 222 and the second moving bar 232 to correspond thereto. At this time, it is preferable that the rotation direction of the screw threads are formed such that the first moving bar 222 and the second moving bar 232 are opposite to each other.

Since the screw thread at the first moving bar 222 and the screw thread at the second moving bar 232 are formed in opposite directions to each other, as the rotating shaft 216 rotates, the first moving bar 222 and the second moving bar 232 are moved in directions opposite to each other.

For example, as shown in FIG. 17 (a), when the rotation shaft 216 rotates in a counterclockwise direction, the first moving bar 222 and the second moving bar 232 are moved in directions approaching each other. As shown in FIG. 17 (b), when the rotation shaft 216 rotates clockwise, the first moving bar 222 and the second moving bar 232 are moved away from each other.

The first moving bar 222 and the second moving bar 232 are driven in the same manner as described above. The edge pressing portion 220 and the moving unit pressing portion 230 perform their respective functions accordingly.

The edge pressing portion 220 and the moving unit pressing portion 230 may be aligned vertically over the sample pretreatment module 100 when the module holder 520 is loaded.

The edge pressing portion 220 is formed at the end of the first moving bar 222 as shown in FIG. 13 to FIG. 16 and may be in a shape to press the upper surface of the cap 120 of the sample pretreatment module 100, particularly, the cap edge portion 129.

The moving unit pressing portion 230 is connected to an end of the second moving bar 232 and is formed in a shape of a cylindrical bar expending to a lower portion so as to press the moving unit 124 located in the hollow portion 122 of the cap 120.

At this time, a through hole 224 is formed at the center of the edge pressing portion 220 so that the edge pressing portion 220 and the moving unit pressing portion 230 do not interfere with each other. Accordingly the moving unit 124 can be pressed as the moving unit pressing portion 230 moves through the through hole 224.

As shown in FIG. 14 regarding an operational process of the edge pressing portion 220 and the moving unit pressing portion 230, when the sample pretreatment module 100 is loaded in a state of being mounted on the module holder 520, the sample pretreatment module 100, the edge pressing portion 220, and the moving unit pressing portion 230 are vertically aligned. At this time, the discharge tip 140 of the sample pretreatment module 100 is partially inserted, and the penetration portion 146 above the discharge tip 140 has not yet penetrated the penetration film 116.

In this state, when the first motor 210 is driven and the rotation shaft 216 rotates in one direction, the first moving bar 222 and the second moving bar 232 are moved away from each other. Accordingly, the edge pressing portion 220 is moved downward to press the cap edge portion 129 of the sample pretreatment module 100.

When the edge pressing portion 220 presses the cap edge portion 129, the body 110 of the sample pretreatment module 100 is moved down and the penetration membrane 116 is penetrated by the penetration portion 146.

Then, if the driving direction of the first motor 210 is changed, the rotation shaft 216 is rotated in the opposite direction. As a result, as shown in FIG. 16, the first moving unit 124 and the second moving unit 124 are moved in directions in which they approach each other.

At this time, the moving unit pressing portion 230 is to press the moving unit 124 by moving down through the through hole 224 formed in the center of the edge pressing portion 220.

When the moving unit 124 moves downward to pressurize, the sample in the chamber 112 is discharged through the discharging portion 142. The discharged sample is dropped on a cartridge (See 10, FIG. 24) for fluid analysis located at the lower portion and used for diagnosis and analysis.

In addition, not only the convenience of the user can be increased by automating penetration of the penetration membrane 116 and discharge of the sample, but also the moving unit pressing portion 230 can be moved a predefined distance at a predefined speed to perform pressurizing by mechanical control.

In addition, since the moving speed and distance of the moving unit pressing portion 230 can be changed exactly as desired according to physical properties such as the type, viscosity, and the like of samples, the human error can be minimized and the fixed quantity can be always discharged.

As described above, the amount of the sample to be discharged depends on the moving distance and the speed of the moving unit 124 of the sample pretreatment module 100. The moving unit 124 is pressed through the moving unit pressing portion 230 with constant speed and distance, thereby, keeping the discharged amount constant as a fixed amount.

The sample pretreatment system 1000 according to the present invention may further comprise a counting sensor 600 for detecting the number of times the sample is dropped. The counting sensor 600 may be provided at one side of the portion on which the sample is dropped as shown in FIG. 14 to FIG. 16.

For example, an optical fiber sensor may be used as the counting sensor 600 in this embodiment. The optical fiber sensor can be manufactured by combining optical fiber cable with the lens-removed amplifier, which can advantageously achieve a fast response speed, can detect a very small object, can be applied to a narrow space, and can be applied to a high temperature.

The counting sensor 600 may be installed on the lower side of the module holder 520, that is, near the portion where the sample is dropped from the sample preprocessing module 100.

In case the optical fiber sensor is used as the counting sensor 600, the number of drops is counted through the light receiving part by detecting the laser beam that is reflected every time the sample is dropped while the laser beam is always being shot.

The counting sensor 600 is not limited to the optical fiber sensor, and any sensor capable of detecting the number of sample drops can be applied.

Figure 18:
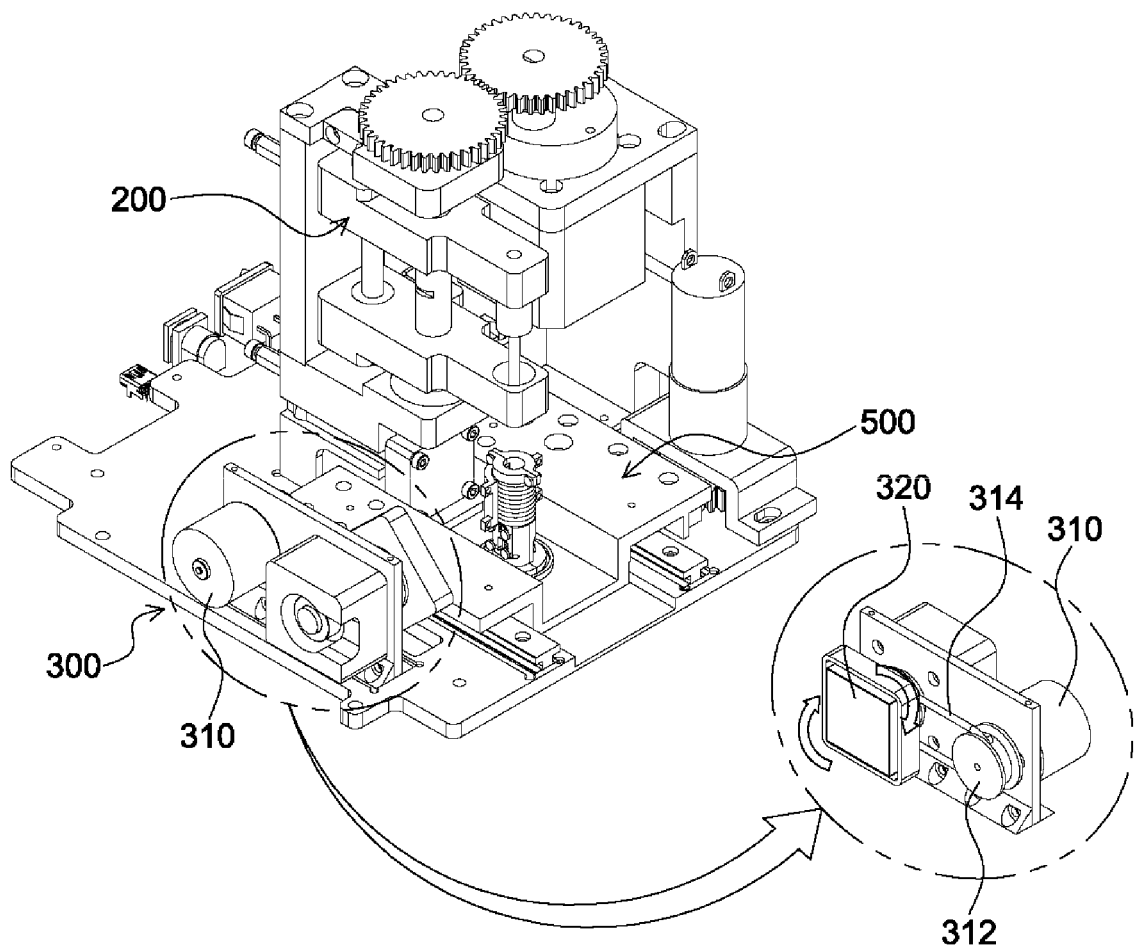
FIG. 18 is a perspective view illustrating a magnetic force generating unit of the sample pretreatment system according to an embodiment of the present invention.

FIG. 18 is a perspective view illustrating a magnetic force generating unit of a sample pretreatment system according to an embodiment of the present invention.

As shown in FIG. 18, the magnetic force generating unit 300 may be provided at one side of the module holder 520 to generate a magnetic force to rotate the dotting substrate 130 provided in the sample pretreatment module 100.

In addition, the magnetic force generating unit 300 may comprise a vortexing magnet 320 rotatably installed on one side of the module holder 520, and a second motor 310 for rotating the vortexing magnet 320.

The rotation axis of the second motor 310 and the rotation axis of the vortexing magnet 320 are connected by a pulley and a belt 314, thereby, transmitting the rotational force of the second motor 310 to the vortexing magnet 320.

As described above, the permanent magnet 132 accommodated in the chamber 112 is magnetized in N-S or S-N along the vertical direction and rotates by a rotational force due to the change of the magnetic field as the vortexing magnet 320 rotates.

At this time, the rotation axis of the permanent magnet 132 is a vertical direction, and the rotation axis of the vortexing magnet 320 is a horizontal direction. Accordingly, they are perpendicular to each other.

Figure 19:
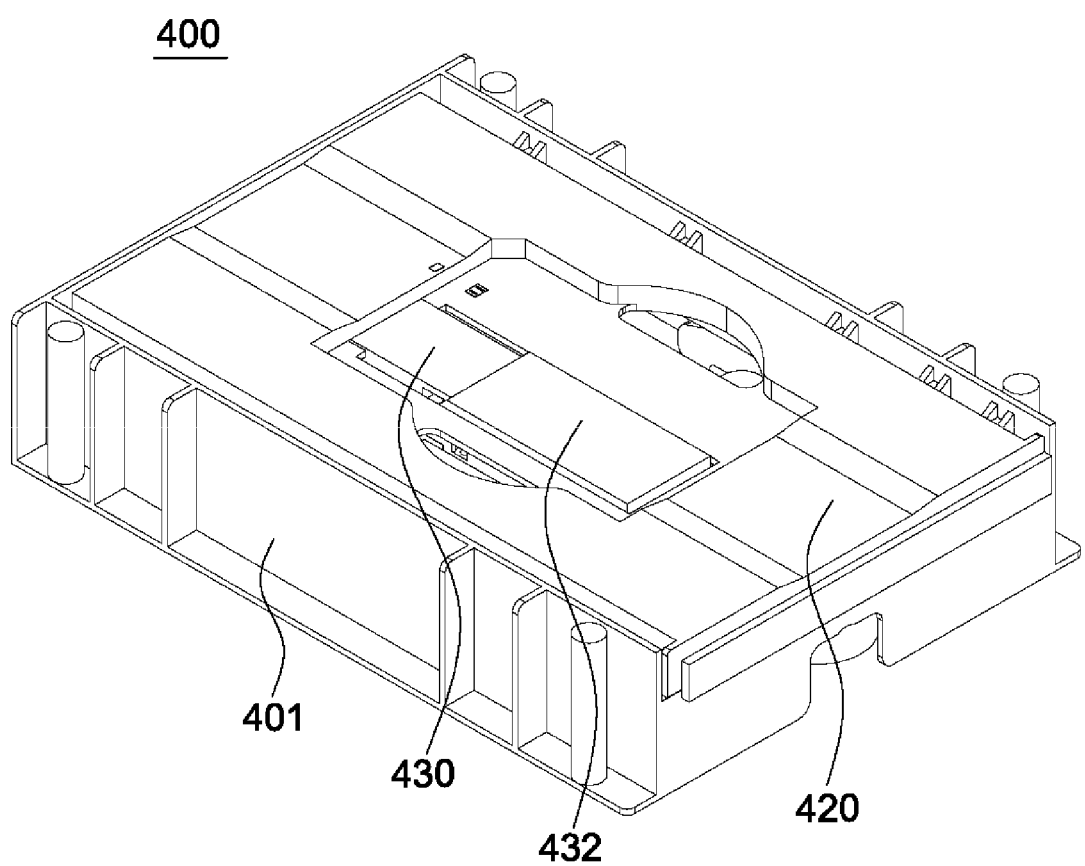
FIG. 19 is a perspective view illustrating a cartridge accommodating portion of the sample pretreatment system according to an embodiment of the present invention.
Figure 20:
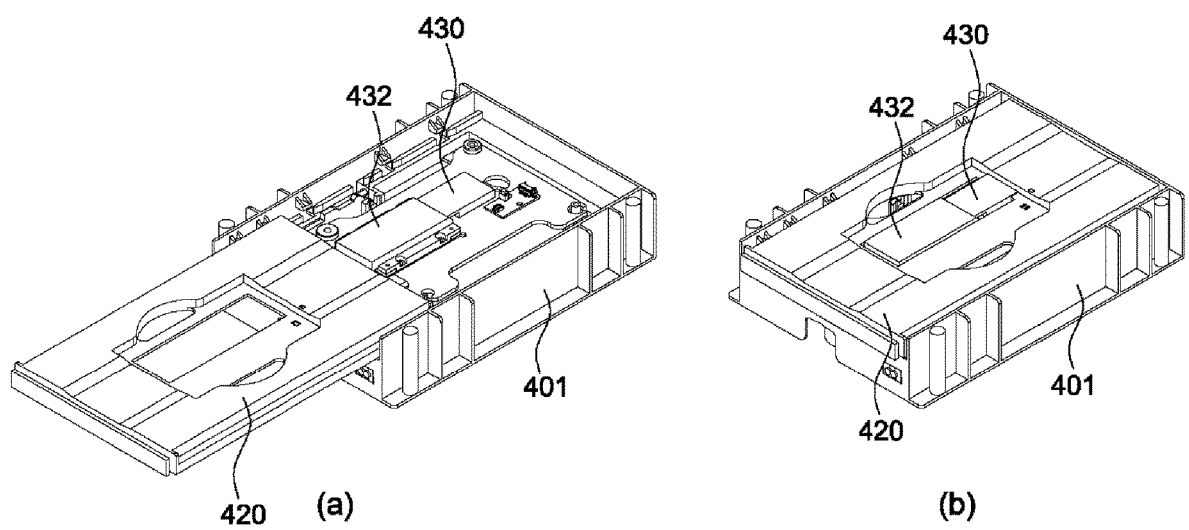
FIG. 20 is a perspective view showing a state in which a sliding door of a cartridge accommodating portion of the sample pretreatment system according to an embodiment of the present invention is drawn out or accommodated.
Figure 21:
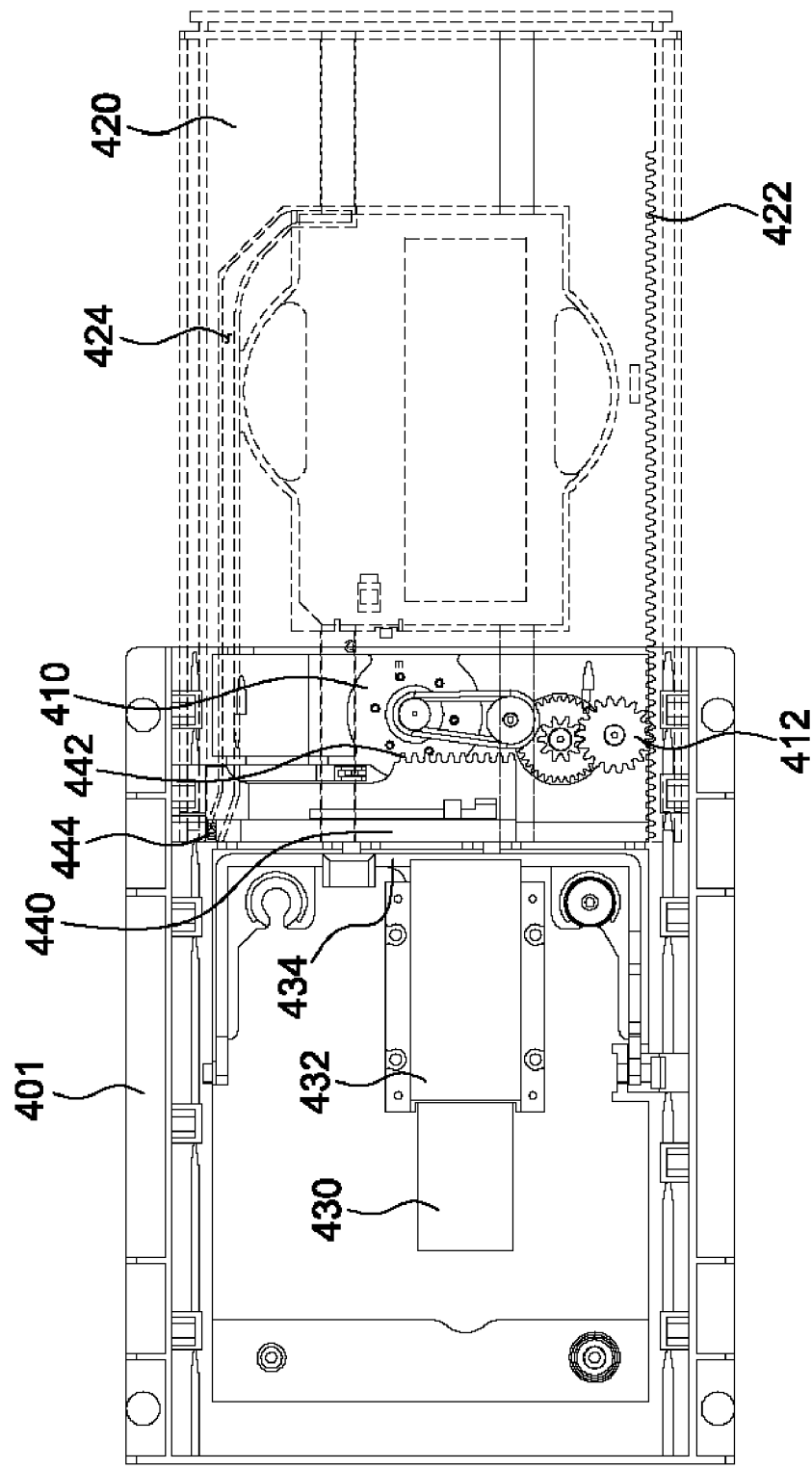
FIG. 21 is a plan view showing a state in which a sliding door of the cartridge accommodating portion of the sample pretreatment system according to an embodiment of the present invention is drawn out.
Figure 22:
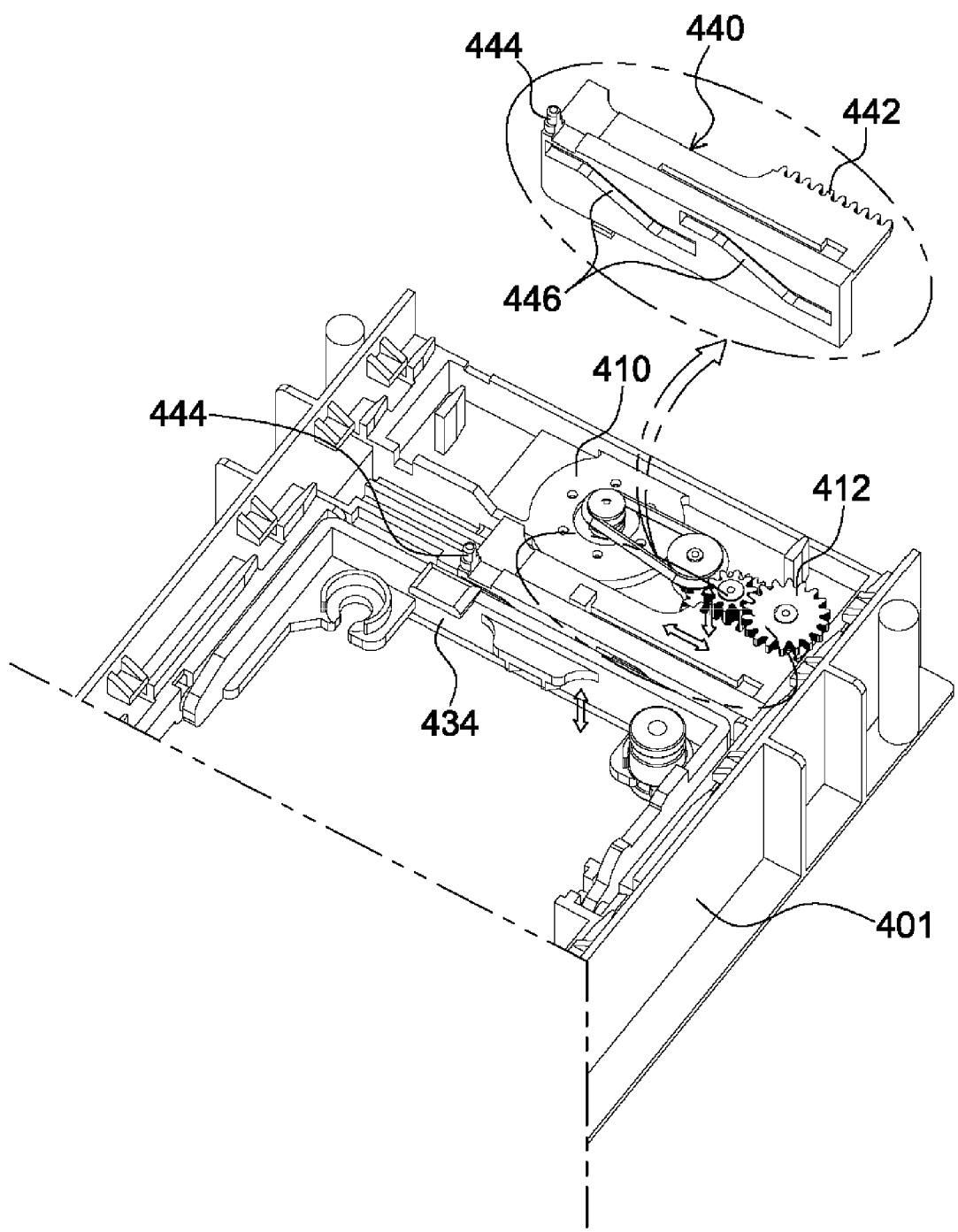
FIG. 22 is a partial perspective view showing an operational structure of a cartridge accommodating portion of the sample pretreatment system according to an embodiment of the present invention.
Figure 24:
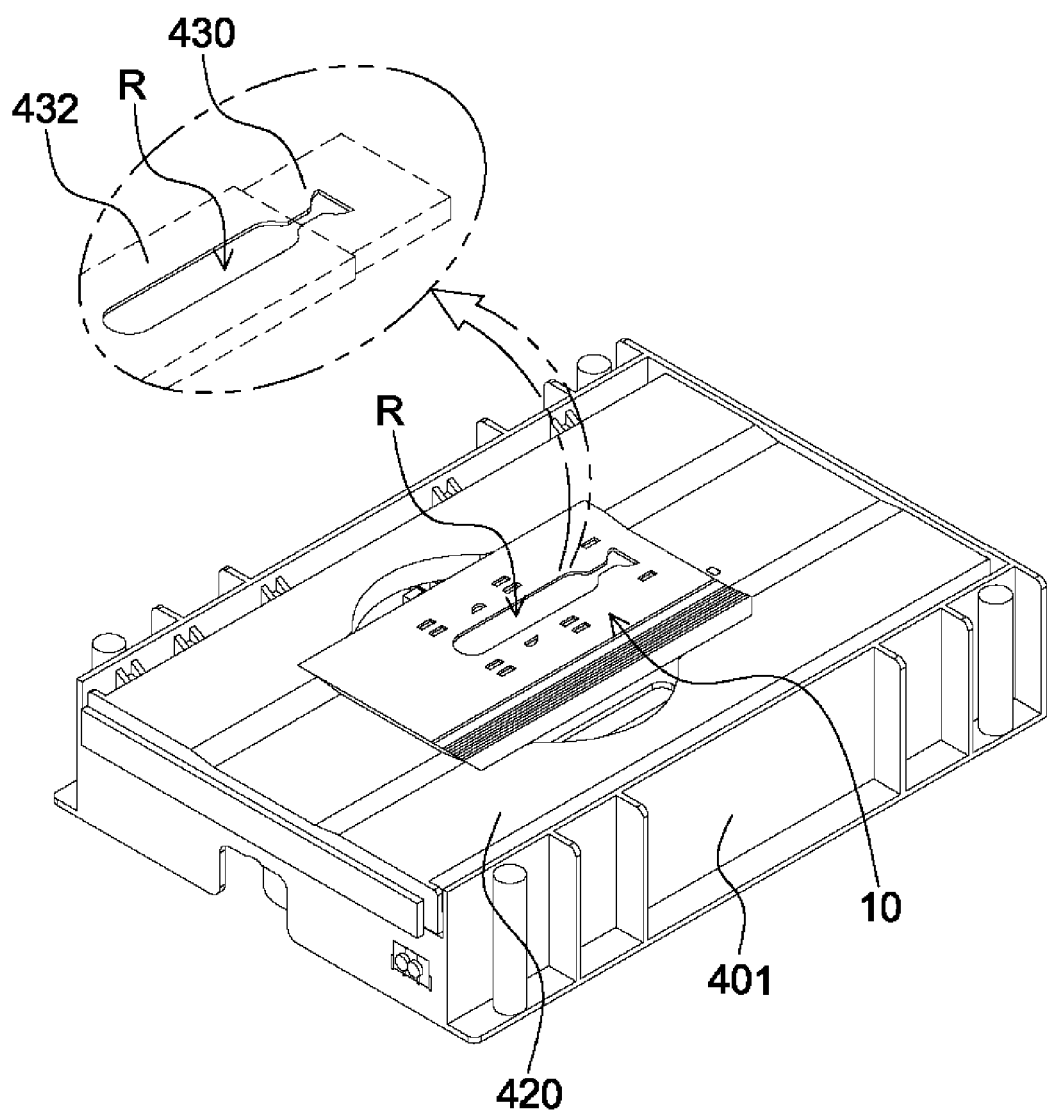
FIG. 24 is a perspective view showing a state in which a cartridge is accommodated in the sample pretreatment system according to an embodiment of the present invention.

FIG. 19 is a perspective view illustrating a cartridge accommodating portion of the sample pretreatment system according to an embodiment of the present invention, FIG. 20 is a perspective view showing a state in which a sliding door of a cartridge accommodating portion of the sample pretreatment system according to an embodiment of the present invention is drawn out or accommodated, FIG. 21 is a plan view showing a state in which a sliding door of the cartridge accommodating portion of the sample pretreatment system according to an embodiment of the present invention is drawn out, FIG. 22 is a partial perspective view showing an operational structure of a cartridge accommodating portion of the sample pretreatment system according to an embodiment of the present invention, FIG. is a diagram showing an operational structure in which the cartridge heater of the sample pretreatment system according to an embodiment of the present invention ascends or descends, and FIG. 24 is a perspective view showing a state in which a cartridge is accommodated in the sample pretreatment system according to an embodiment of the present invention;

As shown in FIG. 19 to FIG. 24, the cartridge accommodating portion 400 is for having the cartridge (See 10, FIG. 24) mounted thereon, and may comprise a cartridge holder 420 for loading or unloading the cartridge 10, and a third motor 410 for providing a driving force for moving the cartridge holder 420 to the location of loading or unloading.

The sample pretreatment system 1000 according to the present invention does not show a cover (not shown) covering the outside of the sample pretreatment system 1000. However, an entrance (not shown) may be provided on the entire cover (not shown) of the sample pretreatment system 1000 so that the holder stage 530 can be taken in and out.

The cartridge holder 420 may be taken in or out by the driving force of the third motor 410 provided at a lower portion of the accommodating portion body 110. Specifically, the rotational force of the third motor 410 is transmitted to a pinion gear 412 of the accommodation portion by combination of a belt, a pulley, and a driving gear.

The pinion gear 412 of the accommodation portion is engaged with a receiving portion rack gear 422 formed in the cartridge holder 420 to transmit power. Accordingly, as the rotation axis of the third motor 410 rotates in one direction or the opposite direction, the cartridge holder 420 can be moved to a withdrawal or accommodating position.

The cartridge accommodating portion 400 further comprises a cartridge heater 430 for heating the loaded cartridge 10. The cartridge heater 430 may be configured to ascend or descend according to the loading or unloading of the cartridge 10.

For this, the cartridge heater 430 is fixedly installed in the heater connection portion 432 and the heater connection portion 432 is coupled to the ascending and descending portion 434. The ascending and descending portion 434 moves up or down depending on accommodation or withdrawal of the cartridge holder 420.

As shown in FIG. 22, a rack guide 440 is further provided. A guide protrusion 444 provided on one side of the rack guide 440 is connected to a guide line 424 formed on the cartridge holder 420.

When the cartridge holder 420 moves, the rack guide 440 moves along the path of the guide line 424. Accordingly, as shown in FIG. 21, when the cartridge holder 420 is moved to be drawn out, the rack guide 440 horizontally moves upward due to the guide protrusion 444 engaged with the guide line 424.

When the cartridge holder 420 is moved to be accommodated inwardly, the guide protrusion 444 engaged with the guide line 424 causes the rack guide 440 to horizontally move downward. At this time, the guide rack gear 442 formed at one side of the rack guide 440 is engaged with the pinion gear 412 of the accommodation portion, thereby, achieving stable power transmission.

On the other hand, an ascending and descending guide line 446 is formed on one side of the vertical surface of the rack guide 440, and an ascending and descending protrusion 436 is formed on the back side of the ascending and descending portion 434 to be engaged with ascending and descending guide line 446.

Figure 23:
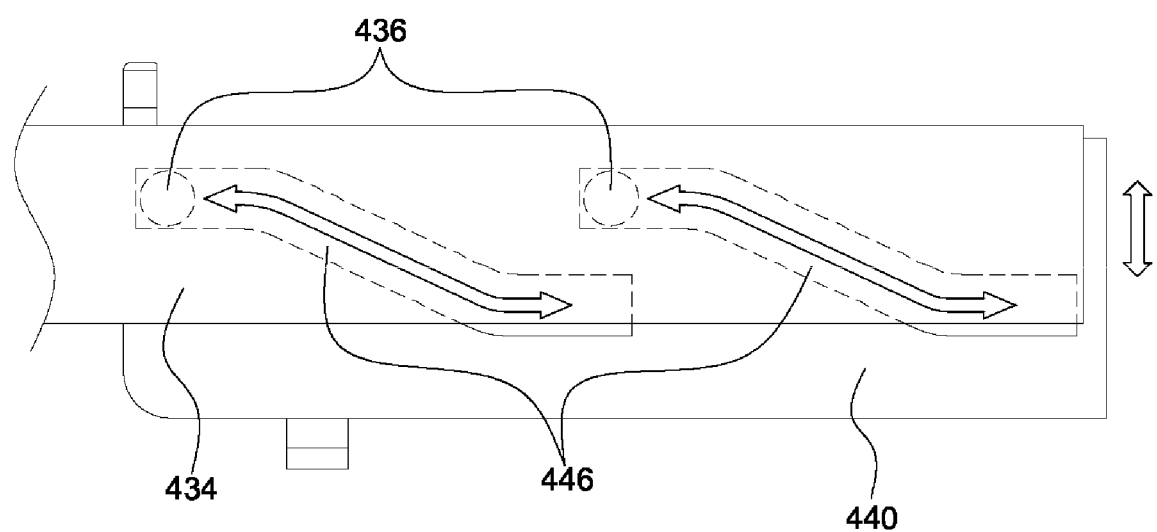
FIG. 23 is a diagram showing an operational structure in which the cartridge heater of the sample pretreatment system according to an embodiment of the present invention ascends or descends.

As shown in FIG. 23, when the rack guide 440 horizontally moves, a protrusion 436 of the ascending and descending portion moves along the path of the ascending and descending guideline 446, whereby the ascending and descending portion 434 performs an ascending and descending motion.

As a result, when the cartridge holder 420 is moved for accommodation or withdrawal by the driving force of the third motor 410, the cartridge heater 430 also ascends or descends.

The reason for the aforementioned composition is to prevent interference or collision of the cartridge heater 430 and the cartridge holder 420 when the cartridge heater 430 and the cartridge holder 420 disposed under the cartridge 10 move for accommodation or withdrawal.

That is, when the cartridge holder 420 is drawn out as described above, the cartridge heater 430 descends. When the cartridge holder 420 is accommodated, the cartridge heater 430 ascends. Accordingly, the above problem can be solved.

As shown in FIG. 24, the heater connection portion 432 is provided so as to surround at least some portion of the cartridge heater 430. When the cartridge heater 430 ascends, the heater connection portion 432 contacts the lower portion of the cartridge 10.

The heater connection portion 432 is preferably made of a material having excellent thermal conductivity and transfers heat from the cartridge heater 430 as a heat source to the cartridge 10 so that the cartridge 10 can be heated.

For example, the heater connection portion 432 may be made of an aluminum material having high thermal conductivity and high hardness. Copper also has good thermal conductivity, but since it has a low hardness, there is a problem of bending easily. Accordingly, aluminum is applied to the heater connection portion 432 in this embodiment.

Since the cartridge heater 430 is very hot, the cartridge 10 made of resin may melt when it is in direct contact with the cartridge 10. To prevent this, the heat is indirectly heated through the heater connection portion 432 made of a thermally conductive material.

Here, the area covered by the heater connection portion 432 is a reaction area R of the cartridge 10 and the heater connection portion 432 preferably has a larger area than the reaction area R of the cartridge 10.

The cartridge heater 430 preferably has an area including a region of the heater connection portion 432 covering the reaction region R.

It is necessary to maintain the sample reaction region R of the cartridge 10 at a constant temperature. Accordingly, the heat radiated from the cartridge heater 430 which is a heat source is uniformly and sufficiently transferred to the reaction region R by the heater connection portion 432.

At this time, in order to increase the heat transfer power of the heater connection portion 432, the area must be made larger so as to have a relatively larger heat capacity than the reaction area R. If the heater connecting portion 432 is smaller than the area of the reaction region R, not enough heat transfer is performed and heat gradient occurs in the reaction region R, thereby, causing imbalance in the flow of the fluid in the channel of the cartridge 10.

Accordingly, the heater connection portion 432 is configured to have a larger area than the reaction region R of the cartridge 10.

Even if the heater connection portion 432 covers the entire reaction region R, if the area of the cartridge heater 430 itself is smaller than or dislocated from the area covered by the heater connection portion 432, heat gradient occurs in the sea heater connecting portion 432 itself, which may adversely affect the fluid flow despite of the excellent thermal conductivity of aluminum.

Accordingly, the cartridge heater 430 is configured to have an area including a region of the heater connection portion 432 covering the reaction region R.

In addition, the heater connection portion 432 is preferably formed in a flat shape. The cartridge heater 430 preferably has a flat shape corresponding to a contact surface with the heater connection portion 432.

The reason for manufacturing the cartridge heater 430 and the heater connection portion 432 as being flat to correspond to the contact surface with the cartridge 10 is to bring them into close contact so as to minimize the air layer. If the contact portion were not closely contacted, heat loss would be caused by air.

Figure 25:
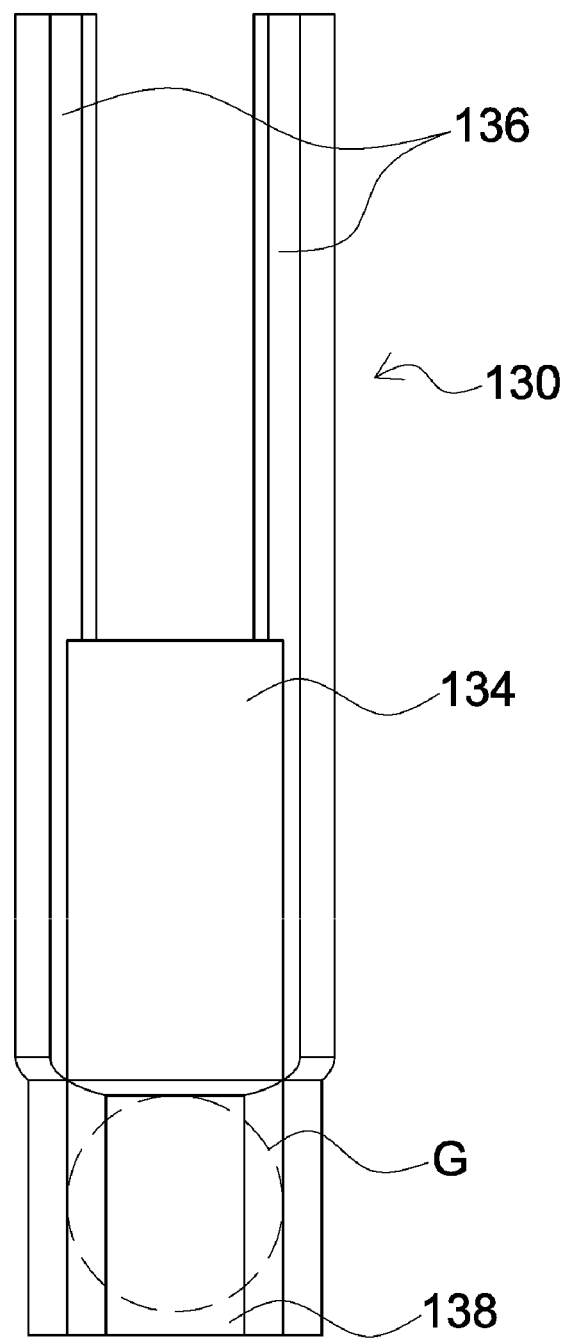
FIG. 25 is a view illustrating a process of dotting and drying gold nanoparticles on a dotting substrate of a sample pretreatment module according to an embodiment of the present invention.
Figure 26:
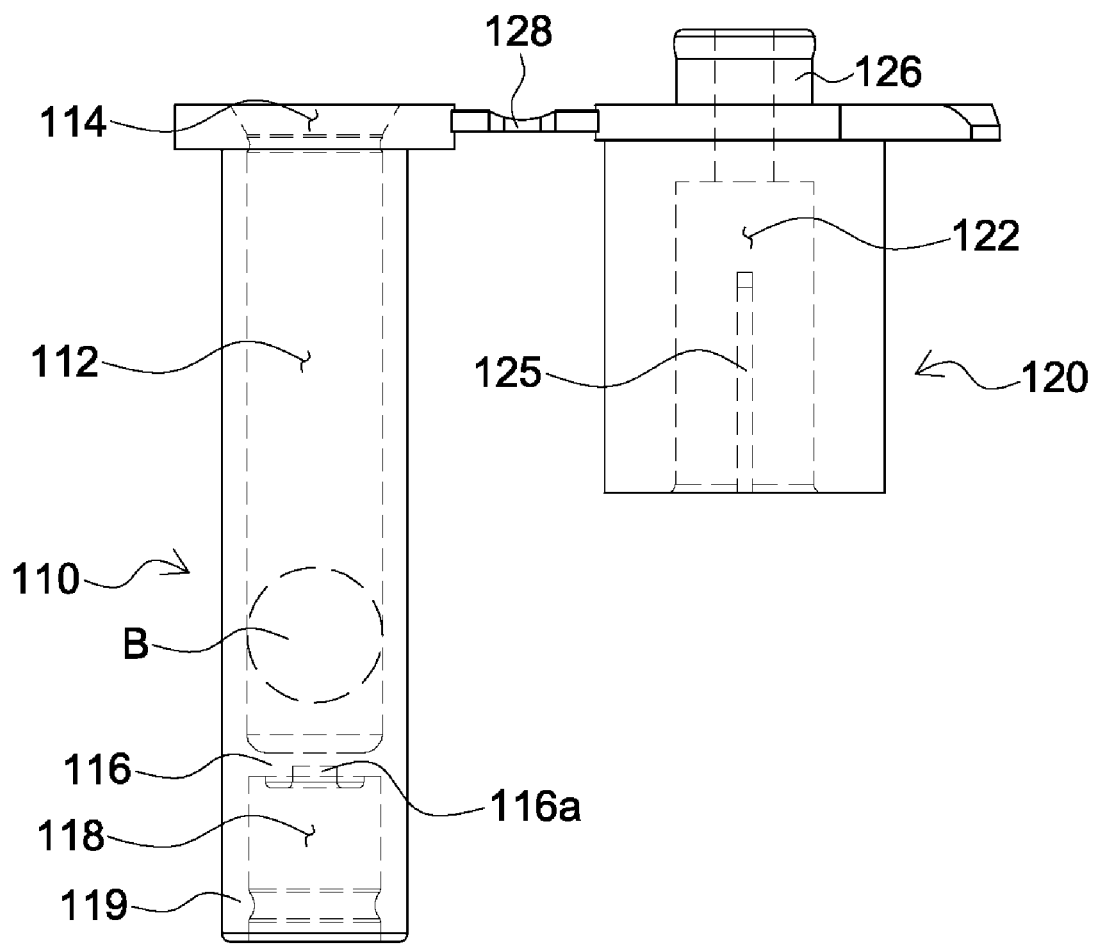
FIG. 26 is a view illustrating a process of dotting and drying a buffer in a chamber of a sample pretreatment module according to an embodiment of the present invention.
Figure 27:
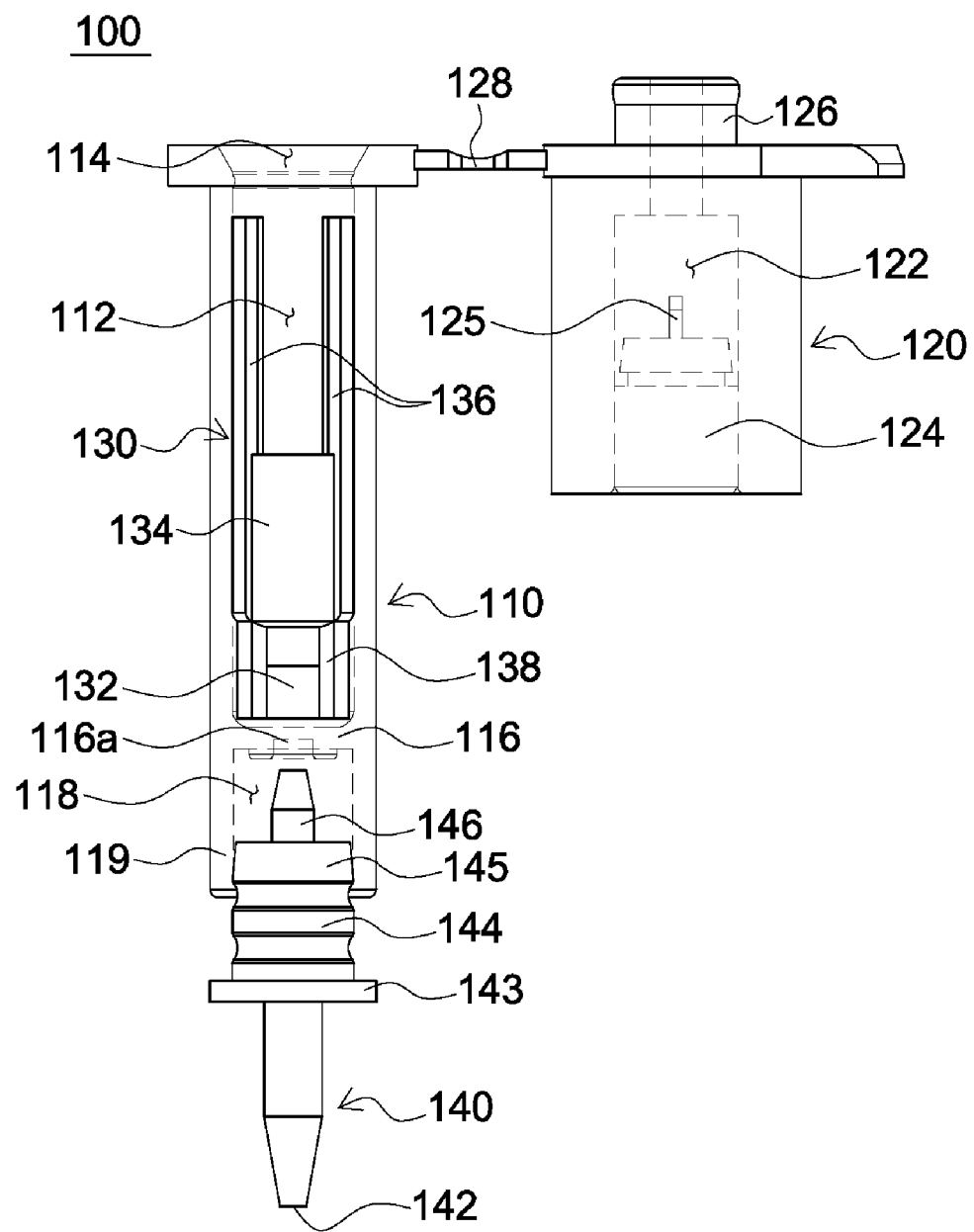
FIG. 27 is a diagram showing a state in which each part of a sample pretreatment module is assembled according to an embodiment of the present invention.
Figure 28:
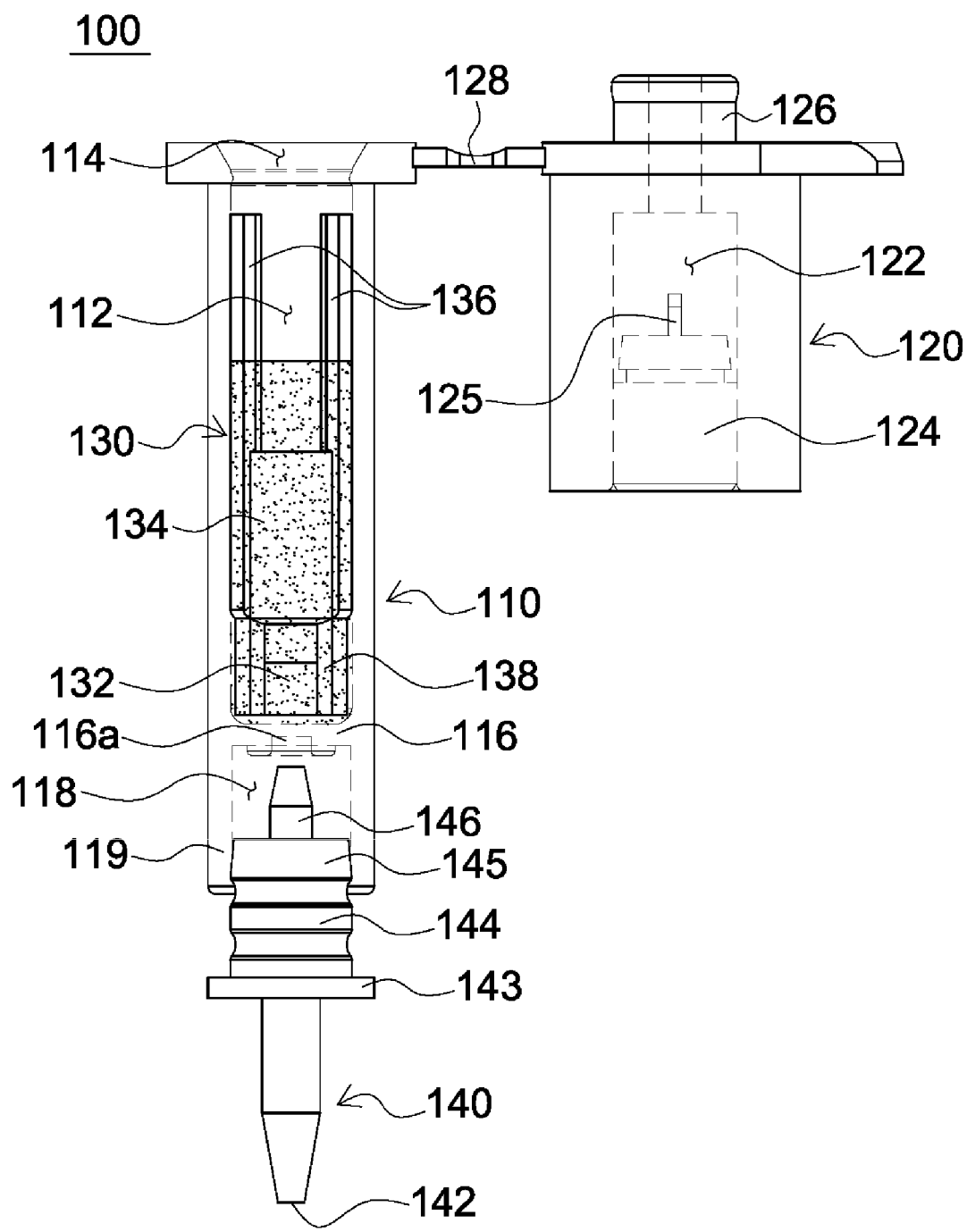
FIG. 28 is a view showing a state in which a sample is injected into a chamber of a sample pretreatment module according to an embodiment of the present invention.
Figure 29:
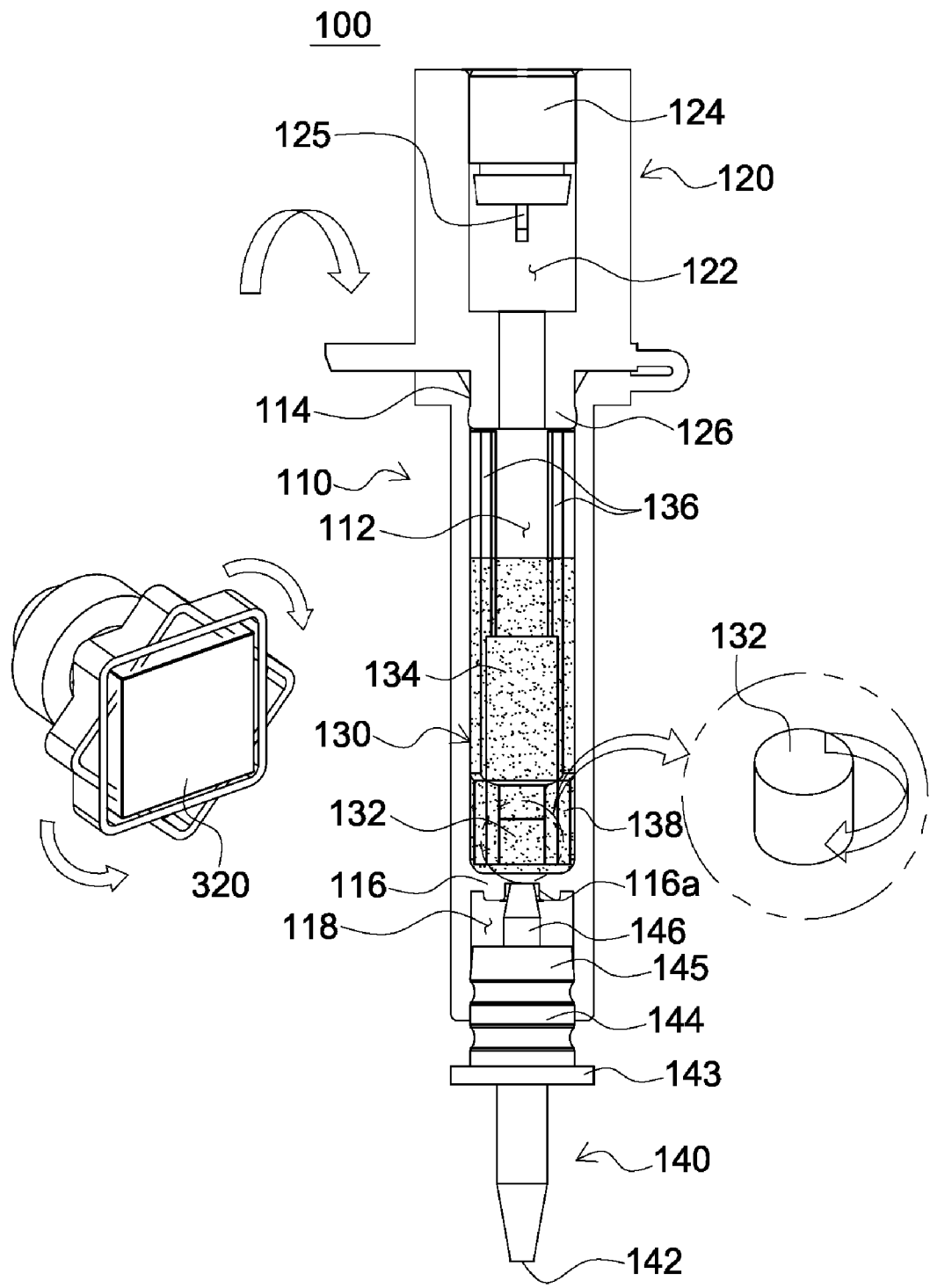
FIG. 29 is a diagram illustrating a process of mixing a sample by applying magnetic force to a permanent magnet of a sample pretreatment module according to an embodiment of the present invention.
Figure 30:
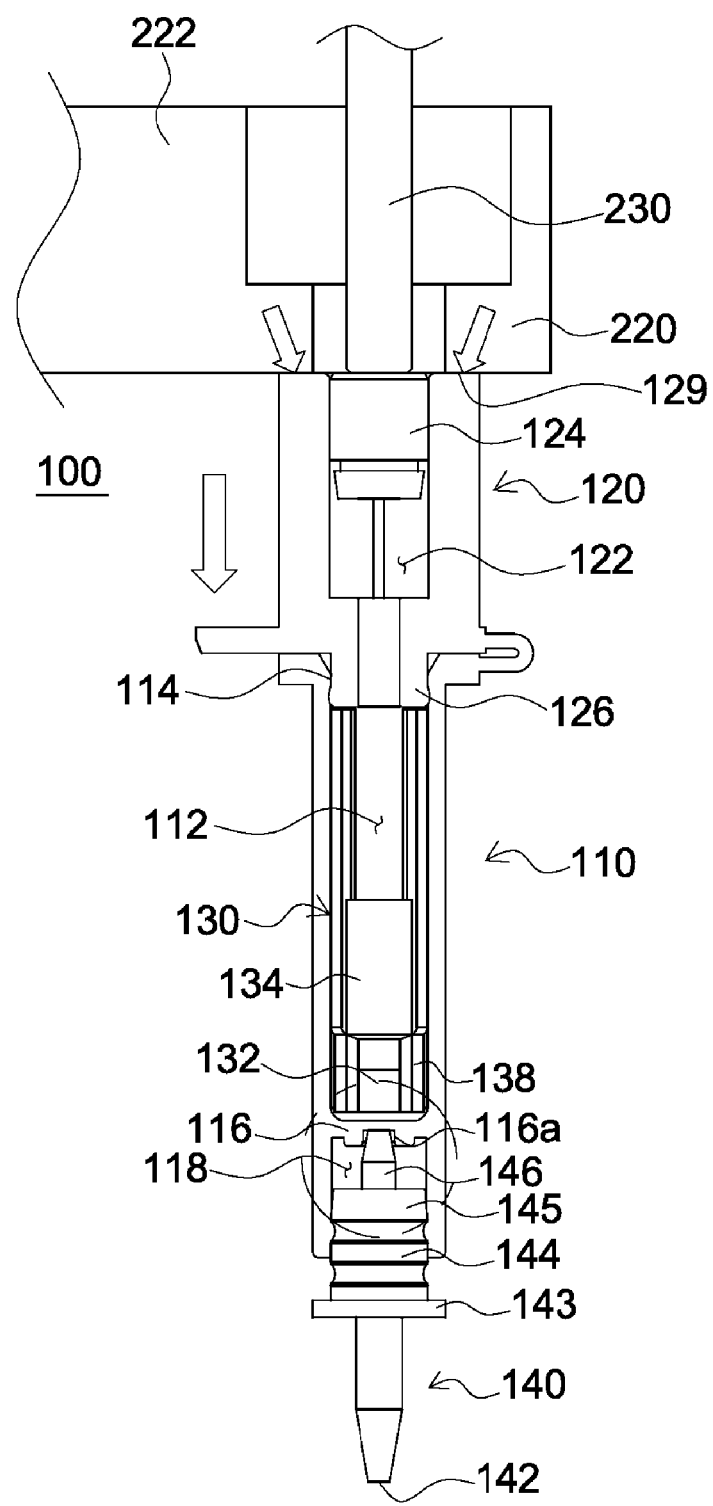
FIG. 30 is a view showing a process of penetrating a penetration membrane by pressing a cap edge portion of a sample pretreatment module according to an embodiment of the present invention
Figure 31:
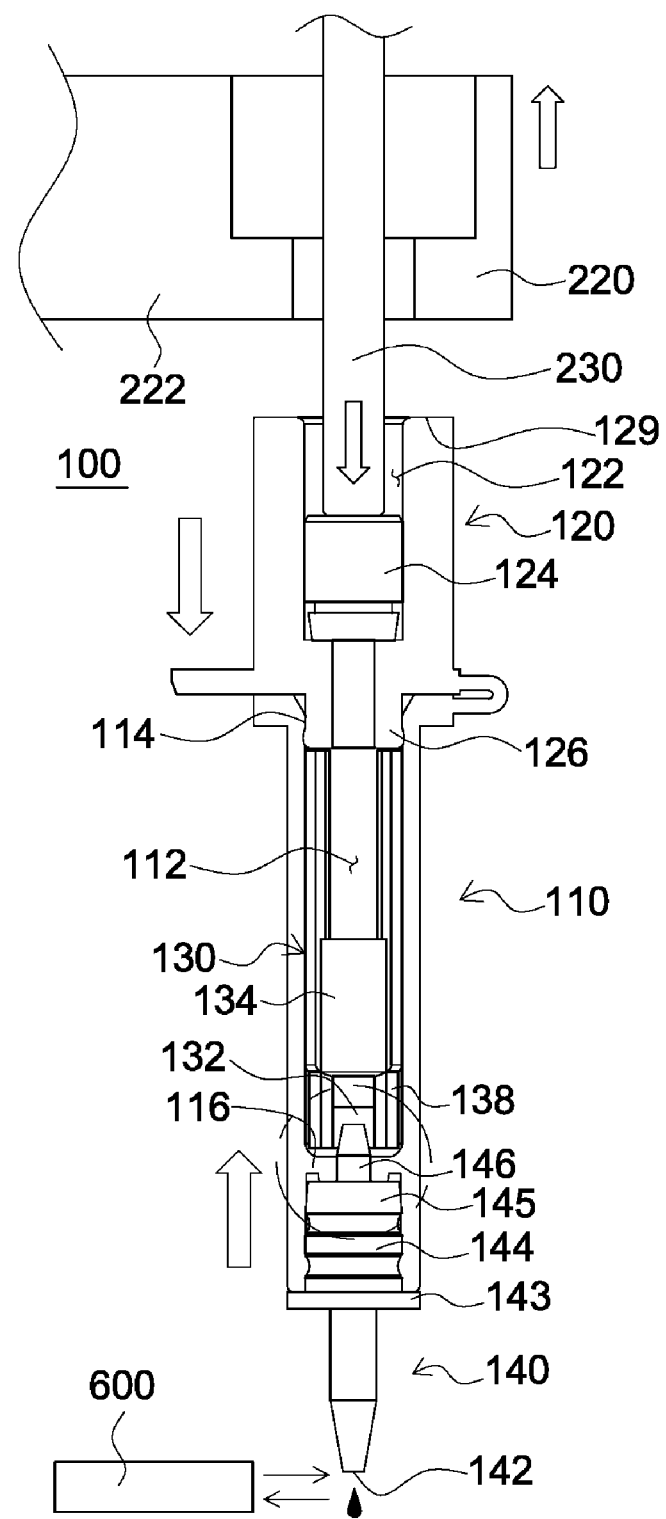
FIG. 31 is a view illustrating a process of discharging a sample by pressing a moving unit of a sample pretreatment module cap according to an embodiment of the present invention.

FIG. 24 is a perspective view showing a state in which a cartridge is accommodated in the sample pretreatment system according to an embodiment of the present invention, FIG. 25 is a view illustrating a process of dotting and drying gold nanoparticles on a dotting substrate of a sample pretreatment module according to an embodiment of the present invention, FIG. 26 is a view illustrating a process of dotting and drying a buffer in a chamber of a sample pretreatment module according to an embodiment of the present invention, FIG. 27 is a diagram showing a state in which each part of a sample pretreatment module is assembled according to an embodiment of the present invention, FIG. 28 is a view showing a state in which a sample is injected into a chamber of a sample pretreatment module according to an embodiment of the present invention, FIG. 29 is a diagram illustrating a process of mixing a sample by applying magnetic force to a permanent magnet of a sample pretreatment module according to an embodiment of the present invention, FIG. 30 is a view showing a process of penetrating a penetration membrane by pressing a cap edge portion of a sample pretreatment module according to an embodiment of the present invention, and FIG. 31 is a view illustrating a process of discharging a sample by pressing a moving unit of a sample pretreatment module cap according to an embodiment of the present invention.

With reference to FIG. 1 to FIG. 31, the sample pretreatment process through the sample pretreatment system 1000 according to an embodiment of the present invention is as follows.

First, as shown in FIG. 24, the cartridge 10 is placed on the cartridge accommodating portion 400 and accommodated. When the cartridge 10 is accommodated, the cartridge heater 430, which has descended as described above, ascends and comes into close contact with the lower portion of the cartridge 10.

The cartridge 10 is heated to a predetermined temperature by the cartridge heater 430. For example, the temperature of the cartridge 10 may be maintained at about 32° C. so that the antigen-antibody reaction can be smoothly performed in the cartridge 10.

Then, as shown in FIG. 25, an additional sample is dotted on the second extension portion 138 of the dotting substrate 130 to be inserted into the sample pretreatment module 100. In this embodiment, the gold nanoparticle (G) is dotted and dried on the second extension portion 138.

Next, as shown in FIG. 26, a release buffer is dotted and dried on the penetration membrane 116 in the chamber 112 of the sample pretreatment module 100. At this time, vitamin D can be used as a buffer in a vitamin D mode.

Then, each part of the sample pretreatment module 100 is assembled as shown in FIG. 27. That is, the permanent magnet 132 and the dotting substrate 130 are disposed in the chamber 112 and the discharge tip 140 is coupled to the body 110. At this time, the discharge tip 140 is partially inserted so that the penetration portion 146 does not penetrate the penetration membrane 116. The moving unit 124 is inserted into the hollow portion 122 of the cap 120.

Then, as shown in FIG. 28 after the sample is injected into the chamber 112 and then the cap 120 is closed, the sample pretreatment module 100 is loaded on the module holder 520 of the sample pretreatment system 1000.

When the sample pretreatment module 100 is loaded on the sample pretreatment system 1000 as described above and then the vortexing magnet 320 is rotated as shown in FIG. 29 a magnetic force causes the permanent magnet 132 to rotate, thereby, mixing the sample.

Then, a module heater 524 is driven to heat the sample. For example, in the case of the vitamin D mode, the sample is heated by heating the sample at 49° C. for about 10 minutes while the module heater 524 keeps heating for about 5 minutes at Free T4 and testosterone at 37° C.

When the pretreatment is completed as described above, the edge pressing portion 220 pushes the cap edge portion 129 downward to penetrate the penetration membrane 116, as shown in FIG. 30, the moving unit pressing portion 230 moves downward and presses the moving unit 124 located in the hollow portion 122 of the cap 120, as shown in FIG. 31.

When the moving unit 124 moves downward to pressurize, the sample in the chamber 112 is discharged through the discharging portion 142 in a fixed amount. At this time, the moving unit 124 is pressed by the moving unit pressing portion 230 with constant speed and distance, thereby, keeping the discharged amount constant as a fixed amount.

The discharged sample is dropped on a cartridge (not shown) for fluid analysis located at the lower portion and used for diagnosis and analysis.

At this time, as shown in FIG. 31, the number of drops is sensed using the counting sensor 600 described above. In addition, the normal number of times of drops required for sample loading is set in advance, and if it is out of the normal number, it can be determined as an error mode.

For example, an error code can be set as follows.

(1) Error 1

If the normal number of drops is not fully counted until the moving unit 124 reaches its maximum pressed position, it is recognized as an error. In this case, it is judged that the number of drops falls below the normal number of drops.

The cause of the error is as follows.

In case a volume of sample capacity is small

Malfunction of the counting sensor 600

In case the sample is leaked in the sample pretreatment module 100

(2) Error 2

If more than 5 drops are detected at the position of the operation of penetrating the penetration membrane 116, it is recognized as an error. The position is set by the coordinates with reference to the lower end of the edge pressing portion 220. In this case, it is judged that the number exceeds the normal number of drops.

The cause of the error is as follows.

In case the sample excessively comes out at the time when the penetration portion 146 penetrates the penetration membrane 116 before the moving unit 124 is pressed.

Failure of the sample pretreatment module 100

(3) Error 3

If the number of drops is counted within a time shorter than the time for the normal number of drops, it is recognized as an error. For example, when 5 drops are measured, in case 5 drops are all counted within 10 seconds, it is predefined as an error, thereby enabling to detect dropping faster than normal. In this case, it is judged that the normal number of drops is exceeded.

The cause of the error is as follows.

The sample excessively comes out at the time when the penetration portion 146 penetrates the penetration membrane 116 before the moving unit 124 is pressed.

Failure of the sample pretreatment module 100.

(4) Error 4

If a drop is detected when the moving unit pressing portion 230 is moved to the initial position after normal operation, it is determined as an error. In this case, it is judged that the normal number of drops is exceeded.

The cause of the error is as follows.

In case a drop formed on the discharge tip 140 after normal operation is further dropped (5) Error 5

If the counted number of drops is not reached to the normal number of drops within the time that the normal dropping could have been completed from the time when the incubation time has ended and the operation has started, it is recognized as an error. Here, it is determined whether or not an error has occurred by setting a sufficient time that the normal drop is expected to be fully completed as the reference time. For example, if the normal operation time is about 1 minute and 30 seconds, the set time shall be 3 minutes. In this case, it is judged that the number of drops falls below the normal number of drops.

The cause of the error is as follows.

In case a volume of sample capacity is small

Malfunction of the counting sensor 600

When the sample is leaked in the sample pretreatment module 100

Table 1 and Table 2 show the results of the actual pretreatment and the quantitative discharge test using the sample pretreatment module 100 of the present invention. For the experimental conditions, plasma and gold particles were mixed and maintained at 37° C. for 5 minutes.

The test was conducted in the following process for both TABLE 1 and TABLE 2.

(1). 5 ul of gold particles are to be dotted and dried on the dotting substrate.

(2). Let the dotting substrate of (1) be inserted into the module.

(3). Let 70 ul of plasma be taken out using a pipette (Reference 2, eppendorf) and injected into the module of (2).

(4). Let the module of (3) be inserted into the pretreatment system apparatus.

(5). Let the module of (4) be heated at 37° C. for 5 minutes in the pretreatment system apparatus.

(6). Let the gold particles and the plasma be mixed for 30 seconds in the magnet stirring manner while (5) is performed.

(7). Let 3 drops of the heated solution from (6) be discharged at the fixed amount.

(8). After confirming the discharge of 3 drops, measure the volume with an electronic balance (ME204, METTLER TOLEDO).

TABLE 1

|  | drop | volume (ul) |
|---|---|---|
| Sample-1 | 3 | 35 |
| Sample-2 | 3 | 35 |
| Sample-3 | 3 | 33 |
| Sample-4 | 3 | 33 |
| Sample-5 | 3 | 35 |
| Sample-6 | 3 | 35 |
| Sample-7 | 3 | 35 |
| Sample-8 | 3 | 35 |
| Sample-9 | 3 | 33 |
| Sample-10 | 3 | 35 |
| Drop volume Ave. |  | 34.40 |
| Standard deviation |  | 0.9661 |
| CV % |  | 2.81 |

TABLE 2

|  | drop | volume (ul) |
|---|---|---|
| Sample-1 | 3 | 33 |
| Sample-2 | 3 | 33 |
| Sample-3 | 3 | 33 |
| Sample-4 | 3 | 32 |
| Sample-5 | 3 | 33 |
| Sample-6 | 3 | 34 |
| Sample-7 | 3 | 34 |
| Sample-8 | 3 | 33 |
| Sample-9 | 3 | 34 |
| Sample-10 | 3 | 35 |
| Drop volume Ave. |  | 33.40 |
| Standard deviation |  | 0.8433 |
| CV % |  | 2.52 |

As shown in Table 1 and Table 2, it can be confirmed that the discharge amount is maintained at a substantially constant level despite the discharged amount is in micro unit, and the standard deviation is less than 1.

The sample pretreatment system according to the embodiments of the present invention described so far can minimize the errors that may occur when the operator manually proceeds, and ensure accuracy and uniformity in the pretreatment and test results of the sample. Accordingly, all the process of mixing, discharging of the sample, and loading of a diagnosis cartridge can be performed automatically and easily, thereby enhancing the convenience of the operation and providing a user-friendly experimental environment.

In the sample pretreatment and loading, the mixing efficiency and the reaction efficiency can be improved by automatically heating the module and the cartridge and maintaining the desired temperature for the desired time. The pressure in the chamber can be uniformly maintained and adjusted so as to prevent the outpouring of the sample even in a sudden pressure change in the chamber and the sample can be heated to a desired temperature within a short time by increasing the heat transfer ability for the sample accommodated in the chamber, thereby, increasing mixing and reaction efficiency.

In addition, the mixing effect of the sample can be increased, and the mechanical driving can be minimized by using the magnetic force, thereby enabling one-stop service for sample pretreatment, discharge of a fixed amount, and loading.

While the present invention has been particularly shown and described with reference to exemplary embodiments thereof, it will be understood by those of ordinary skill in the art that various changes may be made therein without departing from the spirit and scope of the invention as set forth in the following claims. It is therefore to be understood that the modified embodiments are included in the technical scope of the present invention if they basically include elements of the claims of the present invention.

The invention claimed is:

1. A system for pretreatment of sample comprising:
   a holder storage unit having a module holder on which a sample pretreatment module is seated;
   a cartridge accommodating portion for loading a cartridge therein, wherein the sample accommodated in a chamber of the sample pretreatment module is discharged and loaded into the cartridge;
   a magnetic force generating unit for generating a magnetic force to rotate the permanent magnet provided in the sample pretreatment module; and
   a penetration and discharge unit for penetrating a penetration membrane in the sample pretreatment module and discharging the sample by pressing a moving unit of a cap,
   wherein the penetration and discharge unit comprises:
      an edge pressing portion for pressing a cap edge portion of the sample pretreatment module so as to penetrate the penetration membrane in the sample pretreatment module; and
      a moving unit pressing portion for pressing the moving unit to discharge the sample.

2. A system for pretreatment of sample comprising:
   a holder storage unit having a module holder on which a sample pretreatment module is seated;
   a cartridge accommodating portion for loading a cartridge therein, wherein the sample accommodated in a chamber of the sample pretreatment module is discharged and loaded into the cartridge;
   a magnetic force generating unit for generating a magnetic force to rotate the permanent magnet provided in the sample pretreatment module; and
   a penetration and discharge unit for penetrating a penetration membrane in the sample pretreatment module and discharging the sample by pressing a moving unit of a cap,
   wherein the module holder comprises a module heater surrounding an outside of the module holder for heating the sample pretreatment module.

3. The system according to claim 1, wherein the penetration and discharge unit further comprises:
   a first moving bar connected to the edge pressing portion;
   a second moving bar connected to the moving unit pressing portion; and
   a first motor for driving the first moving bar and the second moving bar,
   wherein the first moving bar and the second moving bar are simultaneously moved away from each other or vice versa by operation of the first motor.

4. The system according to claim 3, wherein the penetration and discharge unit further comprises a through hole formed in the center of the edge pressing portion, and wherein the moving unit pressing portion presses the moving unit as it moves by moving through the through hole.

5. The system according to claim 1, wherein the magnetic force generating unit comprises:
   a vortexing magnet rotatably installed on one side of the module holder; and
   a second motor for rotating the vortexing magnet.

6. The system according to claim 1, wherein the cartridge accommodating portion comprises
   a cartridge holder capable of accommodating the cartridge therein, for loading or unloading the cartridge; and
   a third motor for providing a driving force to move the cartridge holder toward a loading or unloading position.

7. The system according to claim 6, wherein the cartridge accommodating portion further comprises a cartridge heater for heating the loaded cartridge, and the cartridge heater ascends or descends depending on loading or unloading of the cartridge.

8. The system according to claim 7, further comprising: a heater connection portion surrounding at least some portion of the cartridge heater and adhering to the cartridge, wherein the heater connection portion has a larger area than the reaction area of the cartridge.

9. The system according to claim 8, wherein the cartridge heater is provided to have an area including the area of the heater connection portion covering the reaction area of the cartridge.

10. The system according to claim 8, wherein the heater connection portion is in a flat shape to adhere to the reaction area of the cartridge.

11. The system according to claim 10, wherein the cartridge heater is in a flat shape to correspond to the contacting surface of the heater connection portion and the cartridge.

12. The system according to claim 1, wherein the holder storage unit further comprises a fourth motor for providing a driving force for loading or unloading the sample pretreatment module mounted on the module holder by moving the module holder.

13. The system according to claim 1, further comprising:
   a counting sensor for detecting the number of times the sample is dropped.

14. A method for controlling a system for pretreatment of a sample comprising:
   setting a cartridge into a cartridge holder and loading the cartridge into the cartridge accommodating portion;
   setting a sample pretreatment module accommodating the sample in a chamber into a module holder and loading it into a holder storage unit;
   rotating the permanent magnets provided in the chamber by rotating the vortexing magnet located at one side of the module holder;
   penetrating a penetration membrane in the sample pretreatment module by pressing a cap edge portion of the sample pretreatment module; and
   loading a sample into the cartridge by pressing a moving unit of a cap of the sample pretreatment module to discharge the sample.

15. The method according to claim 14, further comprising:
   heating the cartridge to maintain the cartridge at a predetermined temperature.

16. The method according to claim 14, further comprising:
  heating the sample pretreatment module mounted on the module holder and maintaining the sample pretreatment module at a predetermined temperature for a predetermined time.

\* \* \* \* \*